US007830149B1

(12) United States Patent
Olsson et al.

(10) Patent No.: US 7,830,149 B1
(45) Date of Patent: Nov. 9, 2010

(54) UNDERGROUND UTILITY LOCATOR WITH A TRANSMITTER, A PAIR OF UPWARDLY OPENING POCKETS AND HELICAL COIL TYPE ELECTRICAL CORDS

(75) Inventors: Mark S. Olsson, La Jolla, CA (US); Dawn E. Shaffer, San Diego, CA (US)

(73) Assignee: Seektech, Inc., San Diego, CA (US)

( * ) Notice: Subject to any disclaimer, the term of this patent is extended or adjusted under 35 U.S.C. 154(b) by 0 days.

(21) Appl. No.: 12/579,539

(22) Filed: Oct. 15, 2009

Related U.S. Application Data

(60) Division of application No. 11/077,947, filed on Mar. 11, 2005, now Pat. No. 7,619,516, which is a division of application No. 10/308,752, filed on Dec. 3, 2002, now abandoned, and a continuation-in-part of application No. 10/268,641, filed on Oct. 9, 2002, now Pat. No. 7,009,399.

(51) Int. Cl.
*G01V 3/10* (2006.01)

(52) U.S. Cl. .................................................... 324/326

(58) Field of Classification Search ....................... None
See application file for complete search history.

(56) References Cited

U.S. PATENT DOCUMENTS

| 4,195,433 | A | 4/1980 | Engman | 43/17 |
|---|---|---|---|---|
| 4,947,012 | A | 8/1990 | Minarovic | 219/535 |
| 5,029,296 | A * | 7/1991 | Shang-Wen | 324/156 |
| 5,231,355 | A | 7/1993 | Rider et al. | 324/326 |
| 5,264,795 | A | 11/1993 | Rider | 324/326 |
| 5,640,058 | A | 6/1997 | Calvo | 307/66 |
| 5,644,237 | A | 7/1997 | Eslambolchi et al. | 324/326 |
| 5,720,627 | A | 2/1998 | Gillbrand et al. | 439/501 |
| 6,009,754 | A | 1/2000 | Casas | 73/492 |
| 6,211,807 | B1 | 4/2001 | Wilkison | 342/22 |
| 6,215,888 | B1 | 4/2001 | Eslambolchi et al. | 382/100 |
| 6,388,575 | B1 | 5/2002 | Galloway | 340/572.1 |
| 6,529,006 | B1 * | 3/2003 | Hayes | 324/326 |
| 6,731,218 | B2 | 5/2004 | Luebke et al. | 340/660 |
| 7,151,912 | B1 | 12/2006 | Morrison | 455/90.3 |
| 2002/0135349 | A1 | 9/2002 | Steber et al. | 324/72.5 |
| 2002/0175820 | A1 | 11/2002 | Oja et al. | 340/573.4 |

* cited by examiner

*Primary Examiner*—Jay M Patidar
(74) *Attorney, Agent, or Firm*—Michael H. Jester

(57) ABSTRACT

A transmitter for use with an underground utilities locator including a portable elongate housing; an electronic circuit mounted in the housing and configured to generate an electrical output signal at a frequency suitable for tracing an underground utility; a pair of springy helical coil type electrical cords each having an inner end connected to the circuit; means electrically connected to an outer end of each of the electrical cords for coupling the predetermined electrical output signal across the underground utility; and the housing having a pair of upwardly opening pockets formed on opposite ends of the elongate housing and each sized to permit the electrical cords to be wrapped into loops and stowed into corresponding ones of the pockets.

10 Claims, 22 Drawing Sheets

UNDERGROUND UTILITY LOCATOR WITH A TRANSMITTER, A PAIR OF UPWARDLY OPENING POCKETS AND HELICAL COIL TYPE ELECTRICAL CORDS

CROSS REFERENCE TO RELATED APPLICATION

This application is a division of currently U.S. patent application Ser. No. 11/077,947, filed Mar. 11, 2005, which itself is a division of U.S. Ser. No. 10/308,752 filed Dec. 3, 2002 (now abandoned), as well as a continuation-in-part of U.S. Ser. No. 10/268,641 filed Oct. 9, 2002, now U.S. Pat. No. 7,009,399 granted Mar. 7, 2006. The entire disclosures of each of the aforementioned patent applications are hereby incorporated in their entirety by reference.

FIELD OF THE INVENTION

The present invention relates to electronic systems and methods for locating buried or otherwise inaccessible pipes and other conduits, as well as cables, conductors and inserted transmitters, by detecting an electromagnetic signal emitted by these buried objects.

BACKGROUND OF THE INVENTION

There are many situations where is it desirable to locate buried utilities such as pipes and cables. For example, prior to starting any new construction that involves excavation, it is important to locate existing underground utilities such as underground power lines, gas lines, phone lines, fiber optic cable conduits, CATV cables, sprinkler control wiring, water pipes, sewer pipes, etc., collectively and individually referred to herein with the term "objects." As used herein the term "buried" refers not only to objects below the surface of the ground, but in addition, to objects located inside walls, between floors in multi-story buildings or cast into concrete slabs, etc. If a back hoe or other excavation equipment hits a high voltage line or a gas line, serious injury and property damage can result. Severing water mains and sewer lines leads to messy cleanups. The destruction of power and data cables can seriously disrupt the comfort and convenience of residents and cost businesses huge financial losses.

Buried objects can be located by sensing an electromagnetic signal emitted by the same. Some cables such as power lines are already energized and emit their own long cylindrical electromagnetic field. Other conductive lines need to be energized with an outside electrical source having a frequency typically in a range of approximately 50 Hz to 500 kHz in order to be located. Location of buried long conductors is often referred to as "line tracing."

A sonde (also called a transmitter, beacon or duct probe) typically includes a coil of wire wrapped around a ferromagnetic core. The coil is energized with a standard electrical source at a desired frequency, typically in a range of approximately 50 Hz to 500 kHz. The sonde can be attached to a push cable or line or it may be self-contained so that it can be flushed. A sonde generates a more complex electromagnetic field than that produced by an energized line. However, a sonde can be localized to a single point. A typical low frequency sonde does not strongly couple to other objects and thereby produce complex interfering fields that can occur during tracing. The term "buried objects" as used herein also includes sondes and marker balls.

Besides locating buried objects prior to excavation, it is further desirable to be able to determine their depth. This is generally done by measuring the difference in field strength at two locations.

The prior art includes many battery powered portable sonde and line locators that employ antennas to sense an electromagnetic signal emitted by buried objects and indicate their location via audible tones and displays. Those that have been commercialized have been difficult to use primarily because they are extremely sensitive to the orientation of their antennas relative to the buried object. With commercially available sonde and line locators it is possible to have signal strength go up as the operator moves farther away from the buried object. Thus these locators can indicate a peak, then a null and then a smaller peak. This can confuse the operator, especially if he or she interprets a smaller peak as the buried object. Users of sonde and line locators refer to the smaller peak as a ghost or a false peak. FIG. 1 is a graphical vertical sectional view that illustrates the foregoing difficulty. A sonde 10 is located inside a plastic pipe 12 beneath a concrete slab 14. The electromagnetic dipole field emitted by the sonde 10 is illustrated by concentric ovals 16. A conventional locator will "see" two smaller false peaks 18 and 20 spaced from the true larger peak 22 by a pair of nulls 24 and 26.

Conventional battery powered portable sonde and line locators have also suffered from user interfaces that are cumbersome to use, inflexible and/or limited in their ability to convey useful information. They typically have a small array of labeled push buttons and a display that is primarily dedicated to indicating numerical values in a manner that is not easy for the operator to interpret. Only a small number of commands can be executed in conventional sonde and line locators and the information is not displayed in a manner that intuitively indicates to the operator how close he or she is getting to the buried object.

There are many instances where the land that is to be excavated may be traversed or criss-crossed by several different utilities such as an AC cable, a water line, a gas line, a sewer pipe and a communications line. It would be desirable to be able to determine their paths and their depths all at one time. Conventional transmitters are commercially available that will output several different signals at different frequencies that can be applied to the same underground object or even to different underground objects, but the line locators that have heretofore been commercially available have not been capable of simultaneously detecting and indicating the locations of the different objects, their depths or their different types.

SUMMARY OF THE INVENTION

It is therefore the primary object of the present invention to provide a portable sonde and line locator that is easier to use.

It is another object of the present invention to provide an improved method for locating a buried object by sensing an electromagnetic signal emitted by the buried object.

It is another object of the present invention to provide a portable sonde and line locator with an improved graphical user interface (GUI).

It is another object of the present invention to provide a portable locator that can simultaneously detect different buried objects and simultaneously indicate their different locations based on electromagnetic signals.

It is still another object of the present invention to provide a method of simultaneously detecting a plurality of different buried objects and simultaneously indicating their different locations based on electromagnetic signals.

According to a first embodiment of the present invention, an omnidirectional manually portable system is provided for locating a single buried object using an electromagnetic signal emitted by the buried object. The system includes at least one antenna array including three substantially mutually orthogonal antennas each sharing a common center point. The system further includes a housing connected to and supporting the antenna array. A circuit at least partially mounted in the housing is connected to the antennas in the array for sensing an electromagnetic signal emitted from a buried object and determining a location of the buried object by measuring signal strength and field angles in three dimensions.

The present invention also provides a method of locating a single buried object using an electromagnetic signal emitted by the buried object that includes the step of traversing a topside area beneath which an object emitting an electromagnetic signal is buried with at least one antenna array including three substantially mutually orthogonal antennas. The method further includes the step of sensing the electromagnetic signal emitted by the buried object with the one array. The method also includes the step of determining a location of the buried object based on the sensed electromagnetic signal without having to align the antenna array relative to the buried object while eliminating nulls and false peaks.

According to a second embodiment of the present invention an omnidirectional manually portable system is provided for locating a plurality of buried objects that emit different electromagnetic signals. The system includes at least one antenna array including a plurality of antennas. A portable housing is connected to and supports the antenna array. A circuit at least partially mounted in the housing is connected to the antenna array for simultaneously sensing a plurality of different electromagnetic signals emitted from a plurality of buried objects and simultaneously indicating a plurality of different locations of the buried objects.

The present invention also provides a method of locating a plurality of buried objects by sensing a plurality of different electromagnetic signals emitted by the objects. The method involves a first step of traversing a topside area beneath which a plurality of objects emitting a plurality of different electromagnetic signals are buried with at least one antenna array. The method involves a second step of sensing the electromagnetic signals emitted from the buried objects with the one array. The method involves a final step of simultaneously determining a plurality of different locations of the buried object based on the sensed electromagnetic signals and simultaneously indicating the different locations to a user.

The first and second embodiments of the portable sonde and line locator may each be provided with an improved graphical user interface (GUI) which includes a SEARCH view in which sensed electromagnetic signal strength for a buried object can be represented both digitally and in analog fashion. In the SEARCH view the display shows a signal strength indicator that moves in a non-linear manner in a first direction in proportion to increasing electromagnetic signal sensed by an antenna array and in a second direction in proportion to decreasing electromagnetic signal sensed by the antenna array. The signal strength indicator can rotate around a track pattern that has an octagonal shape, for example, and a numerical value of the electromagnetic signal sensed by the antenna array can be indicated in a central region of the track pattern. The GUI also includes a trace mode MAP view in which sensed electromagnetic radiation from a pipe or line is shown on the display as a graphic line that moves on the display, side-to-side for example, in order to represent the location of the antenna array relative to the buried line. The GUI also includes a sonde mode MAP view in which sensed electromagnetic signal from a sonde or other transmitter is shown on the display as a sonde axis and at least one pole that move on the display to represent a location of the antenna array relative to the buried sonde. In the sonde mode MAP view the display can further indicate an equator in conjunction with the sonde axis and pole. The display can further indicate a zoom ring when the antenna array is close to a pole, the zoom ring representing a magnified search area near the pole. In both the SEARCH and MAP views the GUI can also show a representation of a globe in which the measured field angle is indicated as being located on the pole if it is at ninety degrees and indicated as being on the equator if it is at zero degrees.

The present invention also provides an improved transmitter for use with a line locator. The transmitter includes a portable housing having at least a pair of outwardly opening pockets. A control panel is mounted on the housing for receiving manually inputted commands. An electronic circuit is mounted in the housing for receiving the commands from the control panel and generating a predetermined electrical output signal in response to the commands. At least a pair of electrical cords are each stowable in a corresponding one of the pockets. The electrical cords each have an inner end that is electrically connected to the electronic circuit. Mechanisms such as clips and/or inductive couplers are electrically connected to the outer ends of each of the electrical cords for coupling the predetermined electrical signal across a selected utility line.

The present invention also provides an improved transmitter for use with a line locator that has a portable housing but does not require the pockets for storing the cords. A control panel is mounted on the housing for receiving manually inputted commands. An electronic circuit is mounted in the housing for receiving the commands from the control panel and generating a predetermined electrical output signal in response to the commands. The control panel and electronic circuit allow a user top select one of a plurality of different frequency bands. Within each frequency band the user can select a channel frequency that is uniquely associated with one of a plurality of different types of utilities. Electro-mechanical mechanisms are provided for coupling the predetermined electrical output signal across a selected utility line.

The present invention also provides an improved clip for use with a transmitter that energizes a buried object for detection by a locator. A mechanical mechanism such as an alligator style clip some other clamping device is provided for establishing an electrical connection to a surface accessible part of the buried object for applying a predetermined output signal from a transmitter to the buried object. A circuit associated with the mechanical clamping mechanism provides a luminous signal to a user indicating that the predetermined output signal from the transmitter has been applied across the buried object.

DESCRIPTION OF THE PREFERRED EMBODIMENTS

Figure 2:
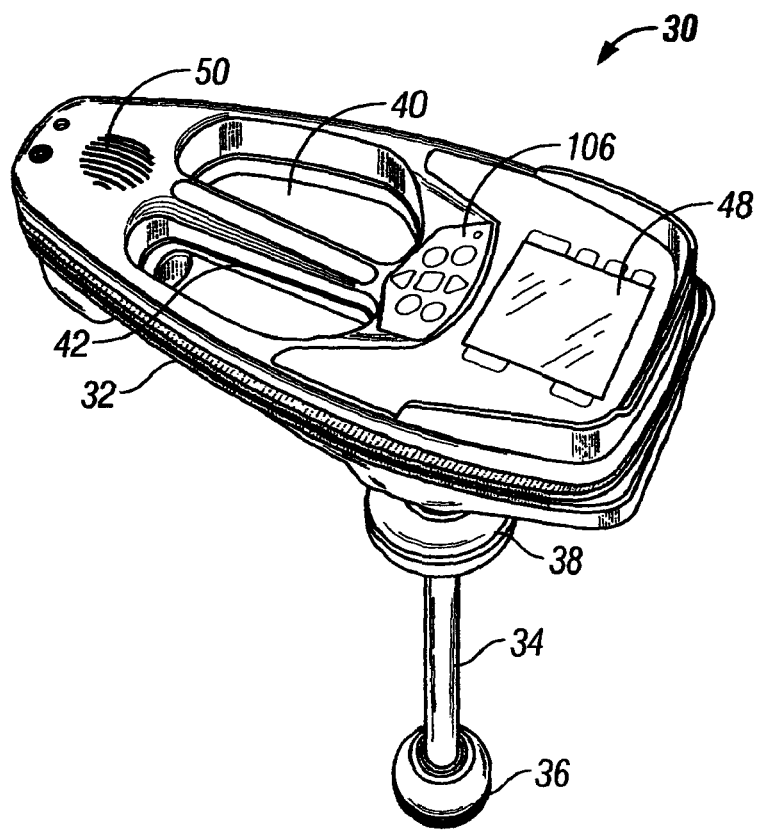
FIG. 2 is a perspective view of a portable battery powered sonde and line locator representing a first embodiment of our invention that is designed to sense and display the location of a single buried object at one time.
Figure 3:
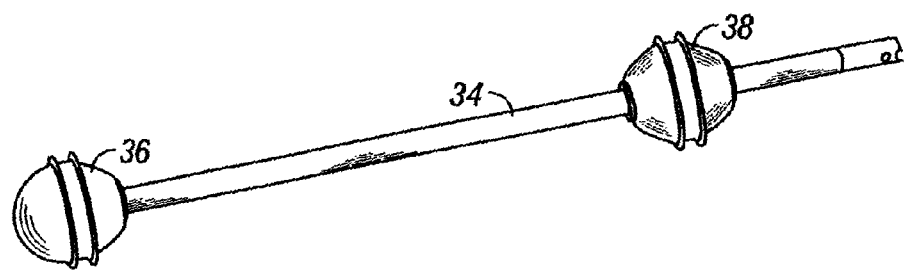
FIG. 3 is an enlarged view of the antenna mast and two sensor balls of the first embodiment.

Referring to FIG. 2, a first embodiment of the present invention is illustrated in the form of a battery powered, omnidirectional, manually portable system 30 that is capable of locating a buried object by sensing an electromagnetic signal emitted by the buried object. The system 30 includes a housing 32 and an elongate member 34 (FIG. 3) that supports spaced apart lower and upper sensor balls 36 and 38, respectively, and connects them to the housing 32. The housing 32 (FIG. 2) is made of openable rigid plastic shells having a large central aperture 40 spanned by a handle portion 42.

Figure 5:
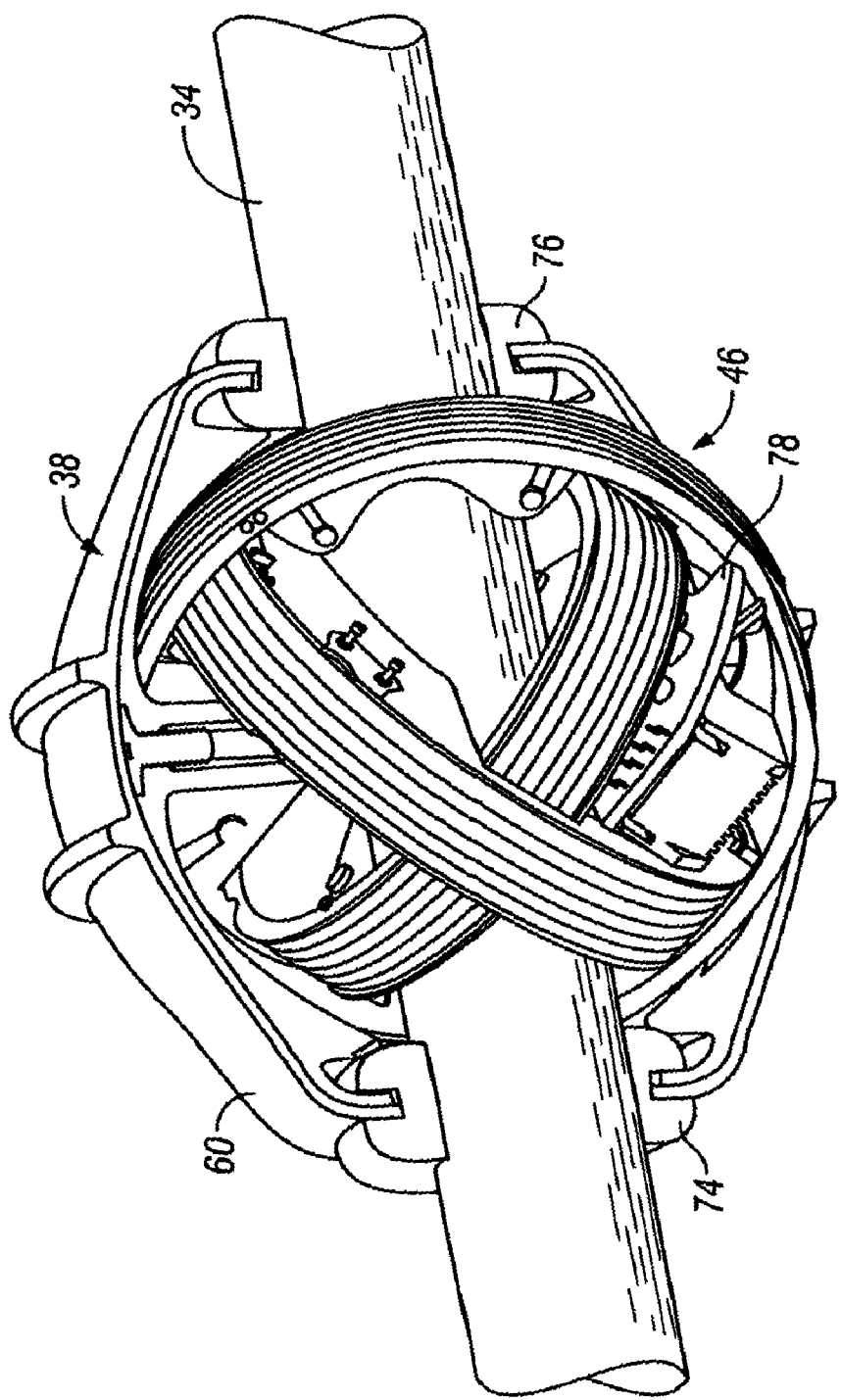
FIG. 5 is an enlarged, broken away view of the upper sensor ball of the first embodiment.
Figure 6:
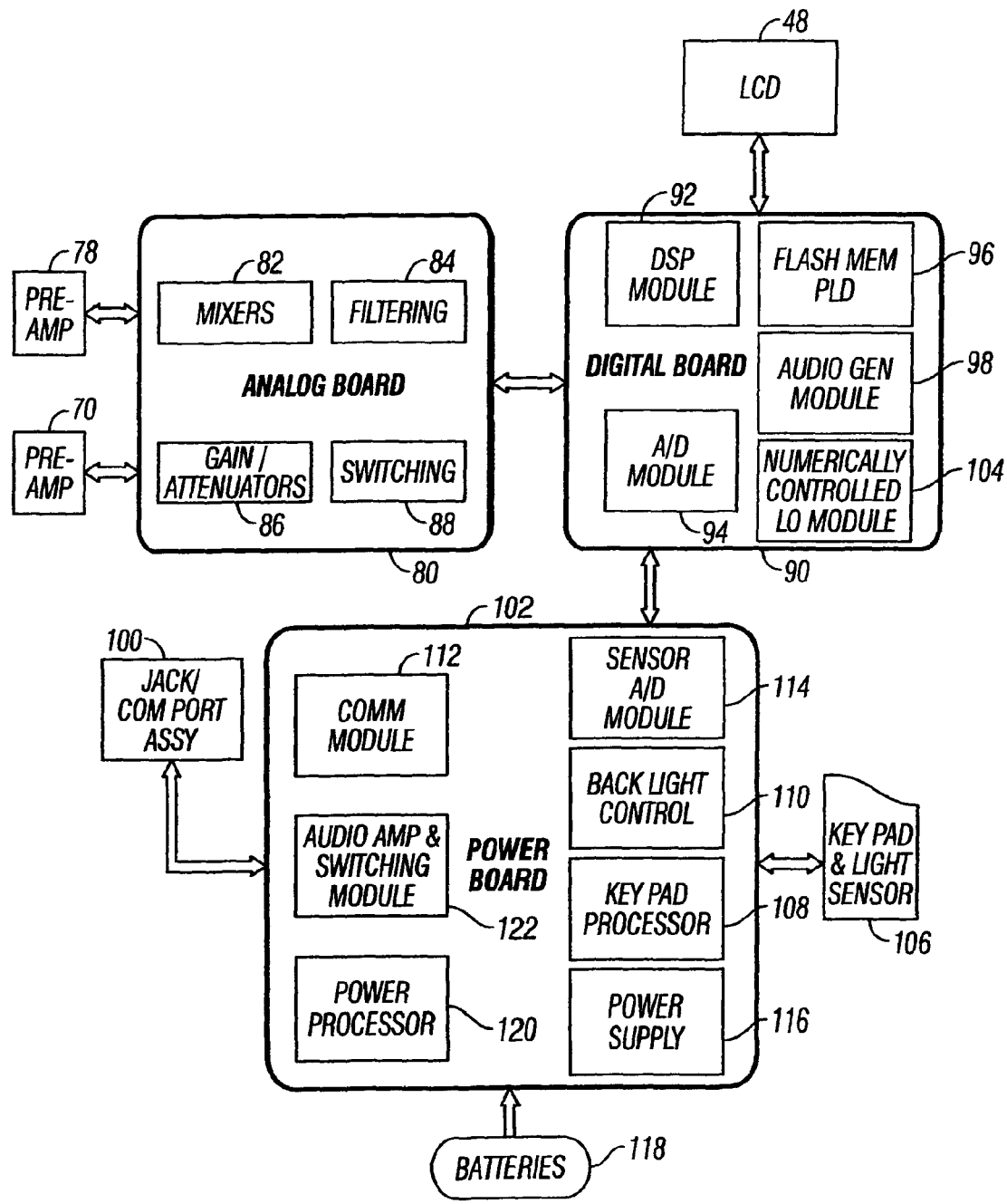
FIG. 6 is a functional block diagram of the electronic circuitry of the first embodiment.

Circuit means illustrated in FIG. 6 are mounted partly in the housing 32 and partly in the sensor balls 36 and 38 for sensing an electromagnetic signal in a frequency range of approximately 50 Hz to 500 kHz emitted from a buried object and determining a location and depth of the buried object by measuring signal strength and field angles in three dimensions. This is accomplished utilizing a first lower antenna array 44 (FIG. 4) and a second upper antenna array 46 (FIG. 5) mounted inside the lower and upper sensor balls 36 and 38, respectively. The circuit means includes a display 48 (FIGS. 2, 6 and 7) for providing a visual indication of the determined location and depth of the buried object. The display 48 is preferably a color or black and white LCD. The circuit means of FIG. 6 also includes means for providing an audible indication with increasing pitch to indicate to the operator that he or she is getting nearer to the buried object, including a speaker (not illustrated) mounted behind a grill 50 (FIG. 2) formed in the housing 32.

Figure 4:
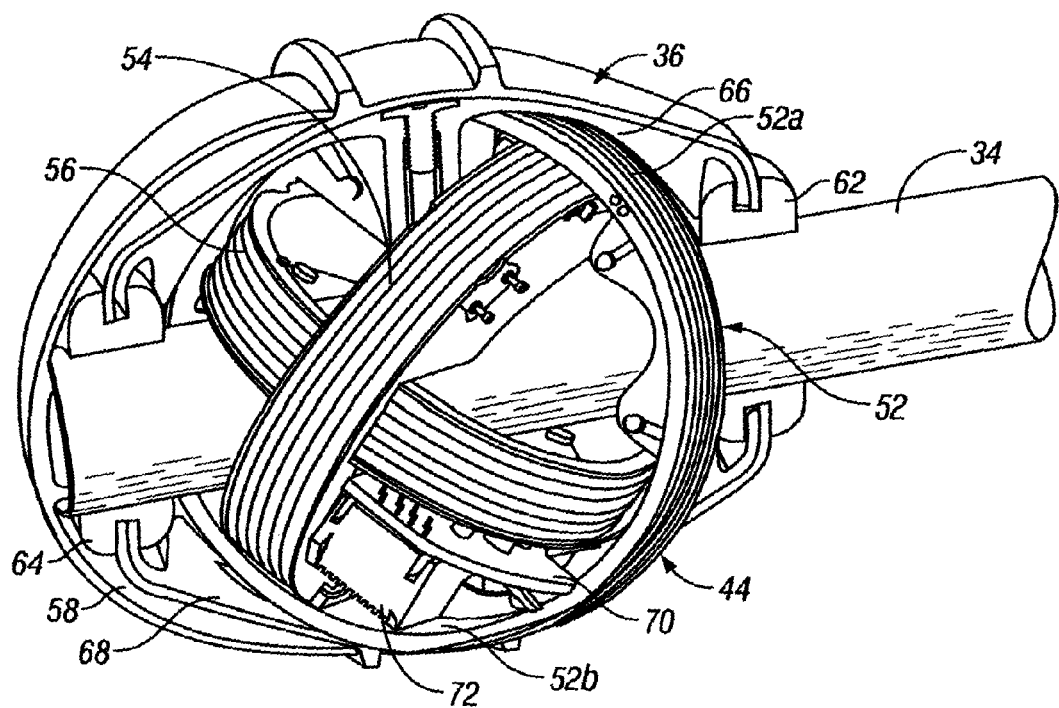
FIG. 4 is an enlarged, broken away view of the lower sensor ball of the first embodiment.

Each of the two antenna arrays, such as the lower antenna array 44 (FIG. 4), includes three substantially mutually orthogonal antennas 52, 54 and 56. Each antenna is formed by a wire coil such as 52a wrapped around a circular plastic mandrel 52b. Each wire coil may be segmented to raise the self-resonate frequency of the coil and thereby improve the range of useful frequencies of electromagnetic signal that can be sensed. The wire coils and mandrels of each array are progressively smaller so that they can be assembled in a nested concentric arrangement. The antennas in each array share a common center point. The elongate member 34 forms an antenna mast and is preferably made from Aluminum or GRP (fiberglass) or other non-ferrous hollow tube. As seen in FIGS. 4 and 5, the elongate member 34 extends through the nested circular antennas of the arrays 44 and 46. The various parts are aligned so that a central axis of the elongate member 34 extends through the pair of common center points of the antenna arrays 44 and 46.

The circular antennas of each of the arrays 44 and 46 are nested and positioned such that an angle subtended between the axis of the elongate member 34 and each of the circular antennas is substantially identical. In the first embodiment this angle is approximately thirty-five degrees. The mandrels, such as 52b, of each of the innermost circular antennas have inner curved surfaces that engage the exterior round surface of the elongate member 34. The innermost mandrels may be keyed or otherwise secured in predetermined vertically spaced positions along the Aluminum tube that forms the elongate member 34. The outer two mandrels of the antenna arrays 44 and 46 interlock with each other and with the innermost mandrels.

The lower and upper sensor balls 36 and 38 (FIG. 3) each include generally spherical elastomeric boots 58 and 60 (FIGS. 4 and 5) which surround and enclose the antenna arrays 44 and 46 in a watertight manner. The lowermost portion of the lower boot 58 (FIG. 4) extends around the lower end of the elongate member 34. The uppermost portion of the lower boot 58 has a lip which is seated in the peripheral groove of a grommet 62 that surrounds the elongate member 34. Another grommet 64 surrounds the lower end of the elongate member 34. Additional shell-like support members 66 and 68 also surround the lower antenna array 44 and have peripheral lips that fit within the peripheral grooves of the grommets 62 and 64. A V-shaped pre-amplifier circuit board 70 is supported at an angle relative to the axis of the elongate member 34 within the lower antenna array 44 and carries pre-amplifying circuitry that is connected to the coils of its three mutually orthogonal antennas via suitable wires and connectors. A connector 72 on the circuit board 70 receives a plug (not illustrated) for connecting the pre-amplifying circuitry to wires (not illustrated) that extend through a hole (not illustrated) in side of the hollow elongate member 34 and through the hollow central core of the elongate member 34. These wires are connected to additional circuit boards hereafter described that are mounted within the housing 32 and carry the remainder of the circuit means illustrated in FIG. 6. The upper sensor ball 38 illustrated in FIG. 5 has an identical construction except that both the lowermost and the uppermost portions of the upper boot 60 each have lips which are seated in the peripheral grooves of additional grommets 74 and 76 that surrounds the elongate member 34.

FIG. 6 is a functional block diagram of the electronic circuitry of the first embodiment. Most of this circuitry resides on several main circuit boards hereafter described that are mounted within the housing 32, except for the pre-amplifying circuitry that is mounted on separate circuit boards, such as 70 (FIG. 4), mounted within the sensor balls 36 and 38. The pre-amplifier circuit board 70 inside the lower sensor ball 36 and the pre-amplifier circuit board 78 mounted inside the upper sensor ball 38 are connected to an analog circuit board 80 (FIG. 6) via multi-connector twisted pairs, such as CAT-5 network cables. RJ style connectors are preferably utilized for quick connection and disconnection. The analog board 80 contains mixer circuits 82, filtering circuits 84, gain attenuator circuits 86 and switching circuits 88.

A main digital circuit board 90 sends a single local oscillator (LO) output signal to the analog board 80 and receives amplified and filtered signals from the antenna coils of the lower and upper antenna arrays 44 and 46. The digital circuit 90 board includes a digital signal processing (DSP) module 92 and an A/D module 94. The DSP module 92 includes digital signal processing circuits, RAM and input/output control circuits that allow the DSP module 92 to process information from the A/D module 94, configure system settings and enable visible and audible indications of location and related data to be indicated to the operator. A flash memory and programmable logic device (PLD) portion 96 of the digital board 90 provide system programming, input/out and control logic and LCD driver functions.

The display 48 (FIGS. 2, 6 and 7) is a graphical LCD with a backlight, and its contrast and backlight levels are set by software control. An audio generation module 98 (FIG. 6) provides tone signals to a speaker and headphone jack and communications port assembly 100 through a power board 102. Besides allowing the connection of a pair of headphones, the assembly 100 permits serial communications, data down load and calibration functions to be performed. A digital volume control is also set by software control. A numerically controlled local oscillator (LO) module 104 on the digital board 90 permits digital frequency control which is set by software control.

Figure 8:
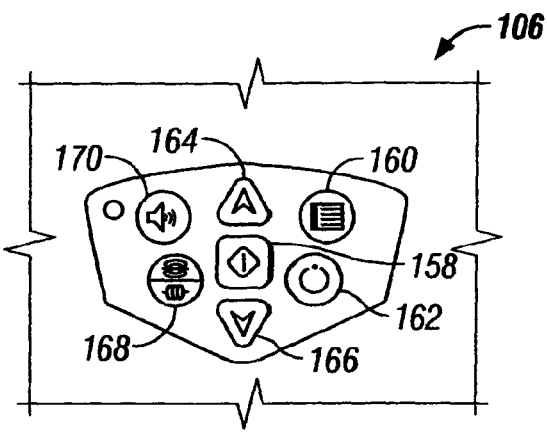
FIG. 8 is an enlarged top plan view of another portion of the housing of the first embodiment illustrating its keypad.

A membrane-type keypad 106 (FIGS. 2, 6 and 8) with a light sensor is connected to a keypad processor 108 (FIG. 6) on the power board 102. The keypad processor 108 performs power enable and keypad scanning functions. The light sensor in the keypad 106 interfaces with a backlight control circuit 110 for automatically adjusting the level of the backlight in the display 48 to compensate for fluctuations in the ambient light level. A communications module 112 and sensor A/D module 114 on the power board 102 facilitate data communications with a personal or other computer and interfacing of sensor information to the digital board 90.

A power supply 116 on the power board 102 receives power from four alkaline C batteries 118 and converts it to provide all of the required voltages in the system circuitry. For batteries other than alkaline batteries, the operator uses the keypad 106 and display 48 to set the type of batteries using a SET UP menu under BATTERY TYPE. This allows the system to correctly monitor battery status and advise when power is LOW and the batteries 118 need to be re-charged or replaced. The power supply 116 also provides linear power to the keypad processor 108 for power management when the system is turned OFF. The system 30 can be configured to turn OFF if no commands have been activated or no motion detected (via optional accelerometer) after a predetermined period of time has elapsed. It can also provide a visual and/or audible warning in advance of this automatic shut down and allow the user to interrupt the power down sequence. The automatic power down feature saves battery power.

A power processor circuit 120 (FIG. 6) provides power termination, keypad status, system control and sensor feedback (battery voltage, temperature, illumination level, optional accelerometer for motion/level detection, backlight control, etc.). Finally, with regard to FIG. 6, an audio amplifier and headphone switching module 122 supports the speaker and headphone jack and communications port assembly 100.

Figure 7:
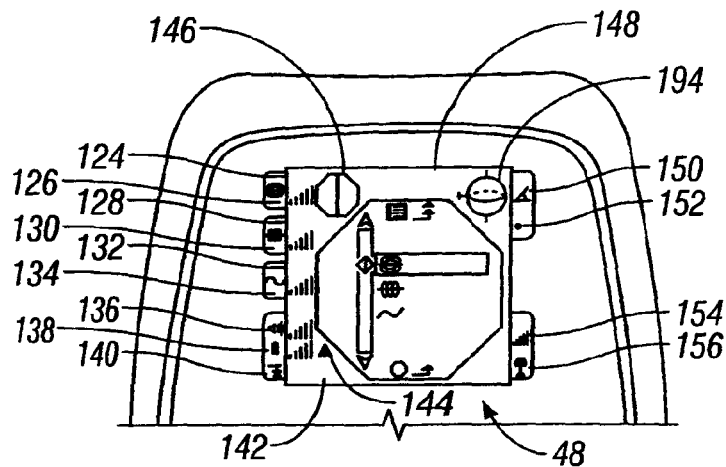
FIG. 7 is an enlarged top plan view of a portion of the housing of the first embodiment illustrating its display.

The first embodiment 30 of the sonde and line locator system of the present invention utilizes a graphic user interface (GUI) in the form of words, numerical data, menus, symbols and icons to indicate data and location information on the display 48 (FIG. 7). This GUI is augmented by audible tones generated in the internal speaker or headphones that are driven by the module 122 (FIG. 6) through the audio jack portion of the assembly 100. The GUI allows an operator to readily configure the system 30 and to easily locate buried objects. The system 30 can be configured so that most of the user menus time out if a selection is not made by the operator within a predetermined amount of time. The system 30 can produce two types of sounds, namely, signal sounds and event sounds. A signal sound is related to increasing or decreasing signal strength. It is a repeating scale that "winds" up when signal sounds are associated with some specific occurrence.

Event sounds include:

| | |
|---|---|
| Equator | Slot Machine |
| Pole | Clang |
| Line | Slot machine |
| Depth Avg & Hold | Ding—Success |
| Depth Avg & Hold | Buzz—Failure |

-continued

| Key Press | Click |
| Low Battery | Buzz |
| Power Down | Chime Sequence |
| Startup | Greeting (spoken) |

A repeating scale audio tone is used to expand the sensitivity of the system 30 to small changes in sensed and visually indicated electromagnetic signal amplitude. The audio tone can cycle from low to high or high to low in conjunction with numerical values indicated on the display 48. Hysterisis is built into the tonal switch portion of the audio amplifier and switching module 122 (FIG. 6) so that the rising and falling switch points are offset to prevent confusing up and down switching at the same level of signal strength. If the sound is turned OFF, all sounds except STARTUP and POWER DOWN are also turned off.

Referring to FIG. 7, the display 48 indicates the sonde frequency 124, sonde level 126, active trace frequency 128, active trace level 130, passive (AC) trace frequency 132, passive (AC) trace level 134, audio level 136, battery level 138 and distance (depth) 140. The display 48 also indicates the distance units 142, overhead indicator 144, 3D field indicator 146, signal strength 148, 2D field indicator 150, horizontal field angle 152, gain level 154 and current strength 156. A few seconds after powering up, the system 30 will allow the operator to select an operating mode from a sonde mode at 512 Hz, an active line trace mode at 51 kHz, or a passive AC line trace mode at 60 Hz. The default sonde mode, active line trace mode, and passive AC line trace mode frequencies can be set by software control elsewhere. Any of the three modes can be selected by moving the highlight cursor and pressing the select key 158 (FIG. 8) in the center of the keypad 106. The highlight cursor is illustrated in FIG. 7 as a small horizontal rectangle inside the octagon in the display 48. Alternatively, the operator can wait four seconds and the system 30 will automatically enter the highlighted mode.

Referring again to FIG. 8, the keypad 106 has a number of other keys that can be manually depressed by the operator to select options and execute commands. These include a menu key 160 that opens and closes the main menu, a power ON/OFF key 162, an UP key 164 and a DOWN key 166. The UP key 164 enables the user to scroll up through menu choices, initiate signal capture, and set the signal and current level to 1000 ("1000 set" explained hereafter) with a long press. The DOWN key 166 enables the user to set the zero level reference of the system 30, scroll down through menu choices, and execute depth average and hold. The DOWN key 166 also zeroes the signal strength when held depressed for approximately three seconds. The select key 158 switches the system between SEARCH and MAP views and also selects the choice highlighted on the display 48 when the system has a menu open. A mode select key 168 opens and closes the operating mode menu. A sound key 170 opens and closes the sound level menu. The operator can cycle the power ON and OFF by depressing key 162 in order to reset 1000 and "set and zero set" to default levels.

The first embodiment 30 of the sonde and line locator system of the present invention uses the multi-directional antenna arrays 44 and 46 (FIGS. 4 and 5) along with circuit means (FIG. 6) that includes advanced software programming to make pinpointing sondes and tracing buried lines fast, accurate and easy. The GUI implemented via the display 48 (FIGS. 2 and 7) allows the operator to "see" the fields and to quickly resolve complex locating problems. The first embodiment 30 measures and displays electromagnetic fields emitted by long conductors such as energized wires, video inspection camera push cables, conduit or pipes when in its tracing mode. The passive AC tracing mode is a specialized case of the tracing mode where the line is already energized with 50 or 60 Hz electrical power. Active transmitters such as sondes are located in the sonde mode. Unlike conventional paddle or stick locators, which can only measure signal strength in the direction of the individual antenna(s), the first embodiment 30 measures both signal strength and field angles in three dimensions (3D). This enhanced capability makes it possible for the first embodiment 30 to indicate a mapping display on the LCD 48.

Figure 1:
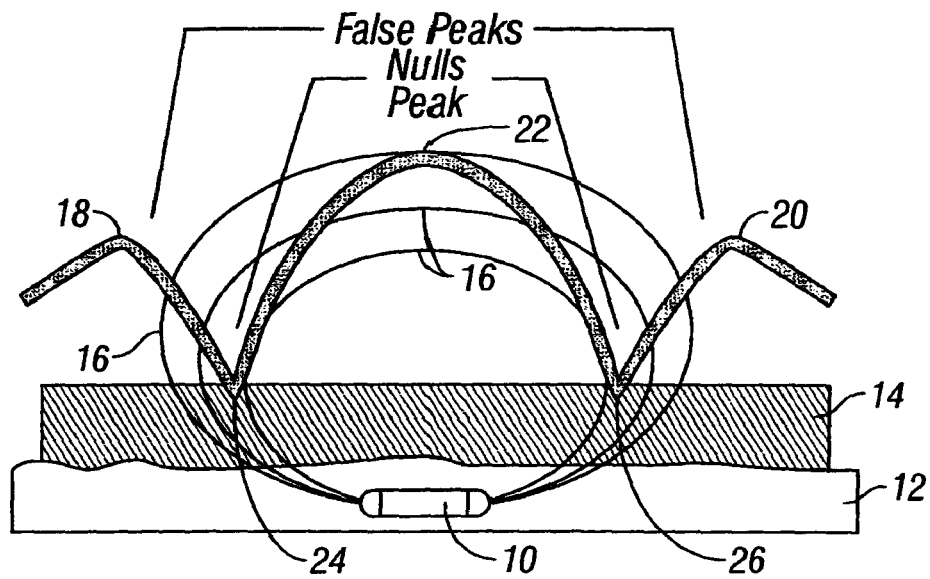
FIG. 1 is a graphical vertical sectional view illustrating a prior art technique of locating a buried sonde.
Figure 9:
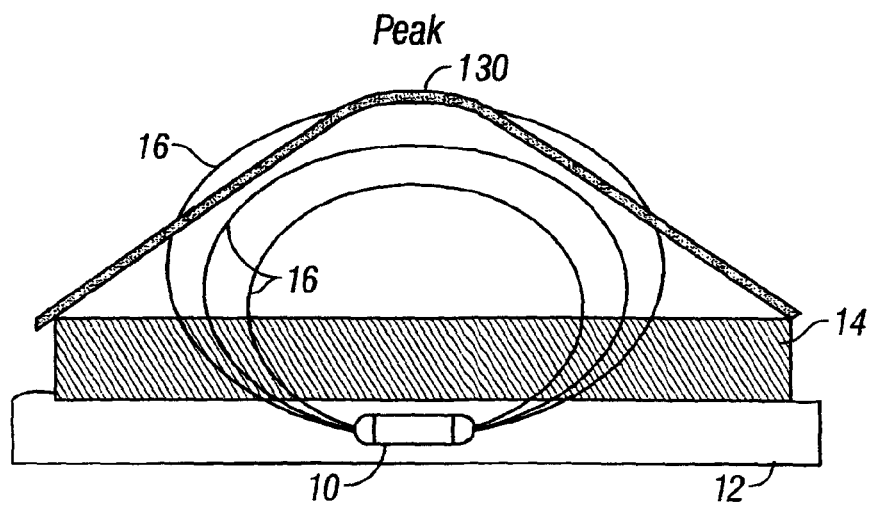
FIG. 9 is a graphical vertical sectional view illustrating the technique of locating a buried sonde with the first embodiment.

FIG. 9 is a graphical vertical sectional view illustrating the technique of locating a buried sonde 10 with the first embodiment 30. The sonde 10 is "seen" only as a single peak 130 and there are no confusing nulls or false peaks. Compare this technique to the prior art approach illustrated in FIG. 1.

Figure 10:
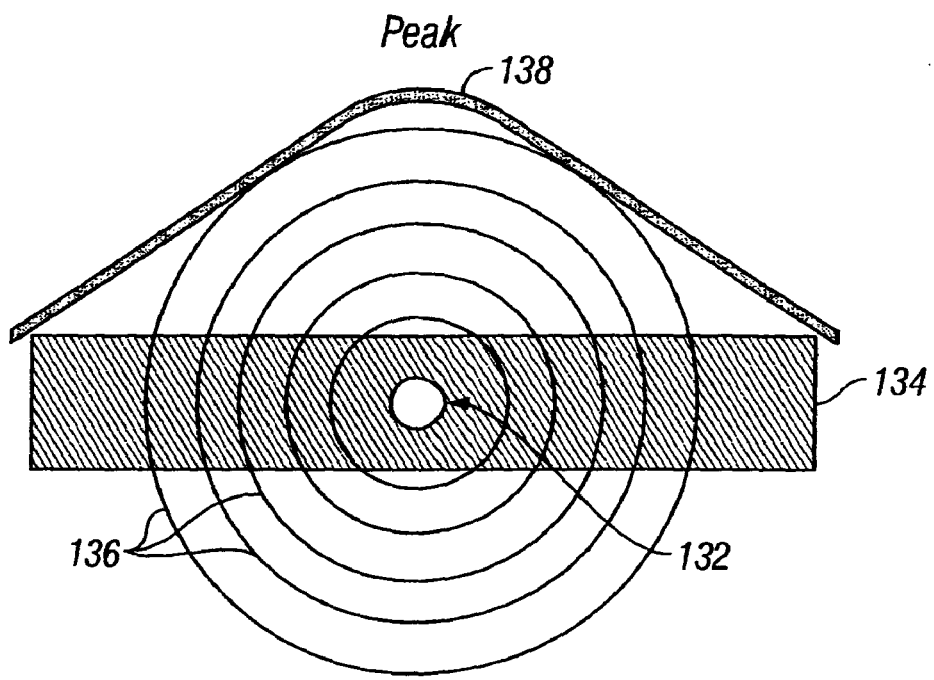
FIG. 10 is a graphical vertical sectional view illustrating the technique of locating a buried pipe with the first embodiment.

FIG. 10 is a graphical vertical sectional view illustrating the technique of locating a metal pipe 132 buried in a concrete slab 134 with the first embodiment 30. The pipe 132 has a signal applied thereto which generates a long cylindrical electromagnetic field illustrated by concentric circles 136. The pipe 132 is "seen" by the first embodiment 30 as a single peak 138 directly above the pipe 132, without any nulls or false peaks.

The first embodiment 30 offers the following advantages over conventional sonde and line locators. First, the sensed electromagnetic signal always gets stronger as the operator carrying the first embodiment 30 gets closer to the buried object. Second, nulls and false ("ghost') peaks are eliminated. With conventional locators, it is possible to have signal strength go up as the operator moves away from the buried object. A conventional locator "sees" a larger peak, then a null, and then a smaller peak. This can confuse the operator especially if he or she interprets a smaller peak (known as a ghost or false peak) as the buried object. Third, the orientation of the first embodiment 30 relative to the buried object does not have any effect on sensed signal strength. The operator can approach from any angle with the first embodiment 30 held in any orientation and he or she need not know the lie of the pipe or wire. Conventional sonde and line locators must be orientated in a specific manner to locate a sonde or trace a line once the initial signal has been picked up. Fourth, the first embodiment 30 facilitates the solution of difficult location tasks by indicating graphical map views and angle indicators on the display 48 to help interpret electromagnetic signal characteristics.

Each of the three modes of operation of the first embodiment (sonde mode, line trace mode and AC line trace mode) has two views that can be indicated on the display 48, namely, a SEARCH view and a MAP view. The SEARCH view emphasizes locating based on signal strength and it is the default view for the sonde mode. The MAP view emphasizes locating based on field angles and is the default view for the line trace and AC line trace modes.

Figure 11:
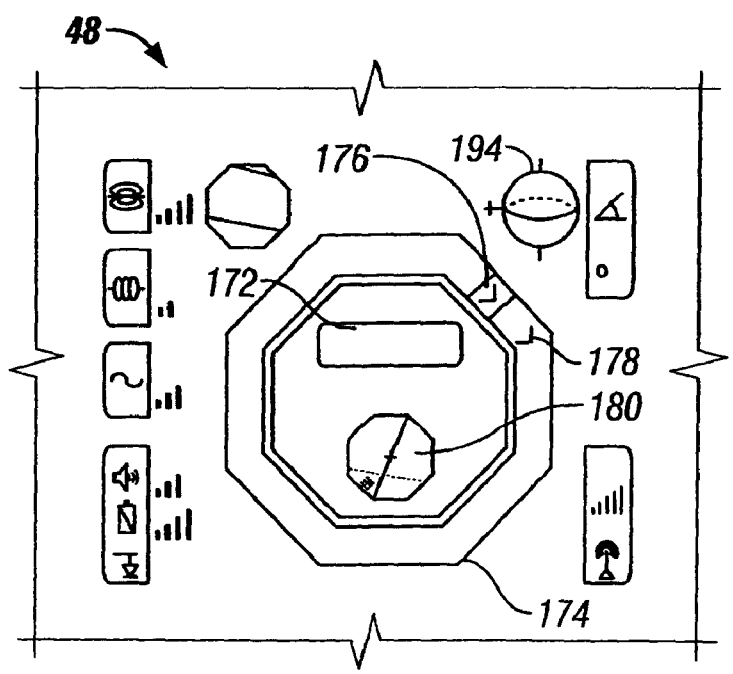
FIG. 11 illustrates a SEARCH view that can be indicated on the display of the first embodiment.

Referring to FIG. 11, in the SEARCH view a numeric (digital) signal strength is indicated at 172 on the display 48. This number gets larger as the system 30 gets closer to the buried object and the sensed electromagnetic signal gets stronger. This number gets smaller as the system 30 gets further away from the buried object and the sensed electromagnetic signal gets weaker. An octagonal "track" pattern 174 has a rectangular signal strength indicator 176 with an internal chevron symbol that continuously moves in a non-linear manner around the pattern 174 to indicate the change in sensed electromagnetic signal strength. Clockwise movement of the indicator 176 represents increased signal strength whereas counter-clockwise movement of the indicator 176 represents decreased signal strength. Thus, the moving signal strength indicator 176 provides a convenient analog representation of the variation in sensed signal strength. Each revolution of the indicator 176 around the octagonal pattern 174 is matched by a corresponding audible tone or sound that indicates larger or smaller sensed signal strength. A naked chevron maximum signal marker 178 marks the point of maximum signal strength and appears when the sensed signal begins to decrease. In the SEARCH VIEW, each revolution of the signal strength indicator 176 is accompanied by a tonal amp, which can repeat for each revolution. This provides an audible indication that represents both the direction and amount of signal sensed and mirrors the same information shown on the display 48 by the indicator 176.

The octagonal pattern 174 (FIG. 11) and the indicator 176 that travels around the same in a generally circular fashion provide a visual analog indication to an operator that represents the variation in sensed signal strength. The pattern 174 need not be octagonal in shape, but could be square, circular, oval, etc. The pattern 174 yields an important advantage in that it provides an interior space inside the "track" where the digital signal strength 172 and a mini-map 180 can be displayed. The mini-map 180 represents a condensed version of the MAP view hereafter described. The MAP view shows visual cues that guide the operator toward the source of the signal in the different modes as explained.

Figure 12:
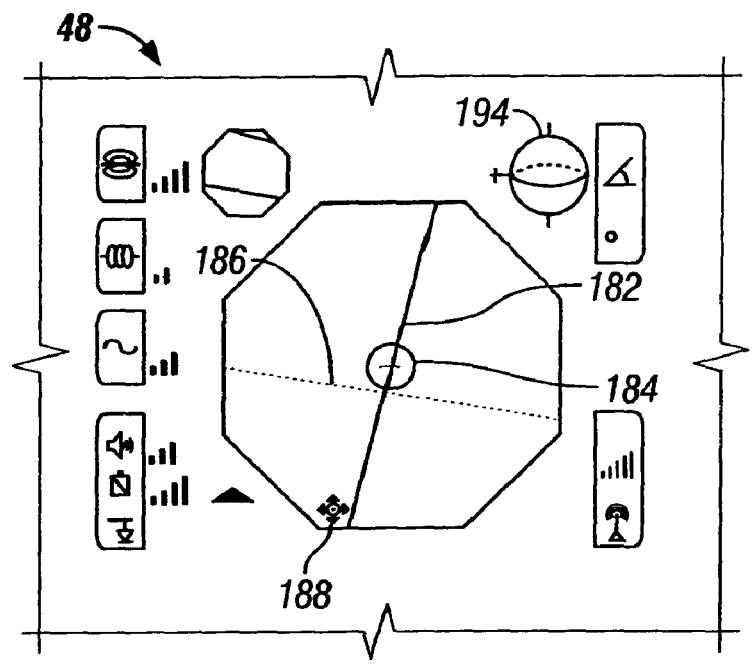
FIG. 12 illustrates a sonde mode MAP view that can be indicated on the display of the first embodiment.

Referring to FIG. 12, when the sonde mode MAP view is shown on the display 48 of the of the system 30 a sonde axis is indicated at 182. This axis represents the approximate direction of the pipe when the system 30 is positioned above the pipe and between the poles. A zoom ring 184 magnifies the area when the first embodiment 30 is close to a pole for more accurate pole location. The zoom ring 184 represents a zoomed out search area adjacent to the pole. The equator is indicated by a dotted line 186 and a pole symbol/icon is indicated at 188. The equator is the point where the field lines are flat or horizontal. As in the earth model, the equator is the line at zero degrees latitude. At the point when the field lines are straight up and down, or vertical, this is called a pole. Poles are distinct points, not lines like the equator. The GUI of the system 30 displays the equator 186 (FIG. 12) where the field angle above the sonde is zero degrees. Event sounds can also be generated in conjunction with this display. These include specific sounds when the system 30 is positioned over the pole, or over the equator, or when other states occur, like low battery.

Figure 13:
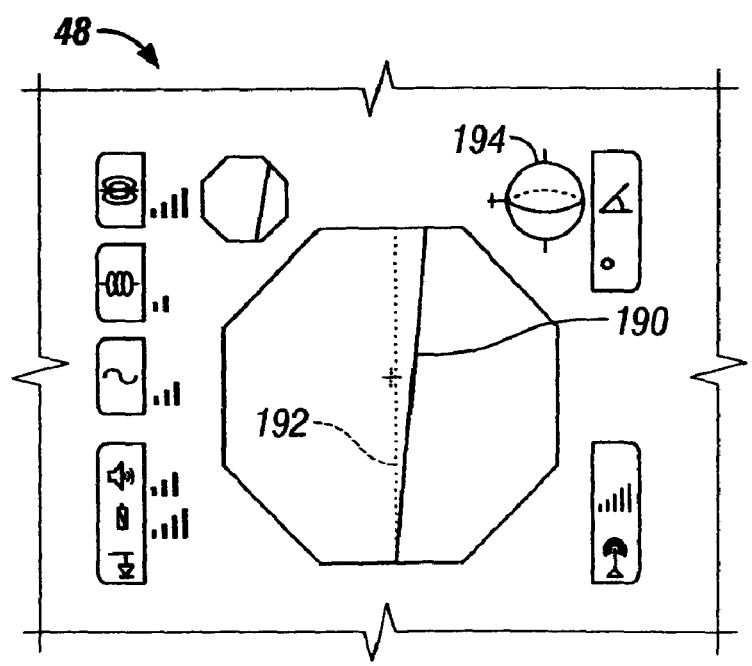
FIG. 13 illustrates a trace mode MAP view that can be indicated on the display of the first embodiment.

Referring to FIG. 13, when the trace mode MAP view is shown on the display 48 of the system 30 a solid graphic line190 represents a position of an energized line as measured by the lower antenna array 44. The dotted line 192 presents the position of an energized line as measured by the upper antenna array 46. The solid graphic line 190 that indicates the location of the system 30 and moves side-to-side on the display with respect to a buried object emitting an electromagnetic field that is approximately cylindrical using the measured angle of the field with respect to the system 30. If the measured field angle is zero degrees (orthogonal to the longitudinal axis of the antenna mast 34) the GUI of the system 30 will display the line 190 centered on the display 48. The solid graphic line 190 is also displayed offset from the center of the display 48 in an amount proportional to the measured tilt of the field. The direction of the offset is set by the direction of tilt of the measured field. The field angle does not have to be explicitly calculated in order to accomplish the foregoing. However, something equivalent thereto must be calculated. This could be done with ratios, but they would be reducible to their field angle equivalents. The presence of any distortion or interference in the field of interest will cause the solid graphic line 190 and the dotted line 192 to move out of alignment. A sound event, such as increasing pitch, can also be generated to indicate nearness and/or to indicate which side of the solid graphic line 190 the system 30 is located on. Such a sound event could be a synthesized voice saying LEFT or RIGHT.

The GUI of the system 30 can also display lines as described above in different colors or labeled in a different way for each of the two antenna arrays 44 and 46. The GUI of the system 30 can also display poles 188 and the equator 186 when locating a buried object with dipole field, e.g. a sonde. The graphical display can be configured as a radar scope type display screen where a "pole" is displayed in the center of the screen if the field is vertical (ninety degrees) and then proportionally offset from the center of the display screen depending upon the direction and the degree of tilt of the field, either with respect to the system 30 itself or with respect to a vertically corrected orientation if a gravity sensor is incorporated into the system.

Figure 14:
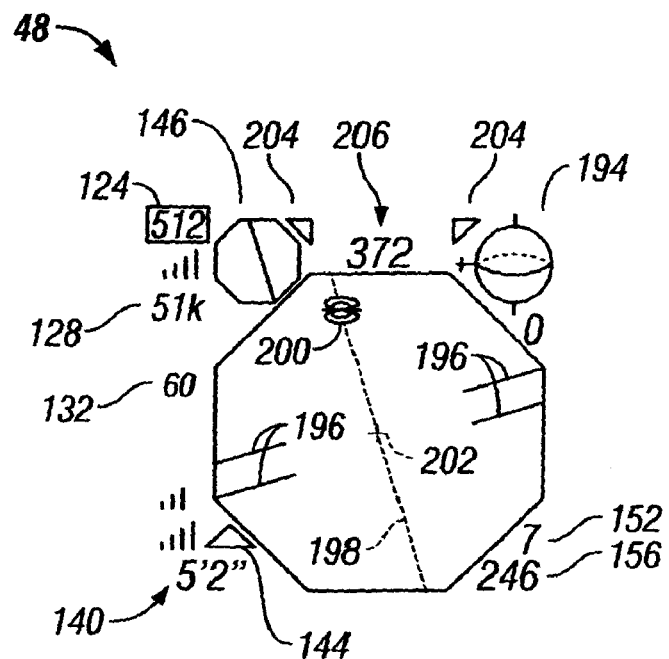
FIG. 14 illustrates an alternate MAP view that can be indicated on the display of the first embodiment.

Referring to FIG. 14, an alternate sonde mode MAP view can be shown on the display 48 of the system 30 in which the orientation of the pipe is represented by a pair of parallel lines 196 which are broken in their intermediate region, which corresponds to the equator, to indicate positional uncertainty when the operator is standing on the equator. Clearly, a pipe or other conduit must exist in order for a sonde to be inserted into the same so the parallel lines 196 indicate the sonde axis. The lines 196 move or rotate as the operator walks around above the sonde. The dotted line 198 represents the equator and the icon 200 indicates that the system 30 is in its sonde mode. The sonde icon 200 alternates from one end of the equator to the other. The dashed cross-hair 202 represents the center point of the display 48. The small triangular symbols or brackets 204 on either side of the digital signal strength number 206 are displayed whenever the current signal strength shown is equal to the largest value stored in memory for the current locating session (since POWER UP). This allows the operator to move along the equator and then stop as soon as the peak (strongest sensed signal) is passed. As soon as the signal strength begins to decrease, the brackets 204 and the sonde sound event turn OFF. When the operator reverses direction and returns to a point of equal or greater signal strength the brackets 204 reappear and the sound event returns.

The system 30 measures depth by comparing the strength of the signal detected by the lower antenna array 44 to that detected by the upper antenna array 46. The system 30 need not have upper and lower arrays to accomplish depth measurement, and indeed depth could be measured using only a single one of the arrays 44 or 46 that includes three mutually orthogonal antennas with a fourth antenna spaced above or below the array. In order to accurately measure the depth of the buried object the elongate member 34 which functions as the antenna mast should be pointed at the source of the electromagnetic signal. The actual depth is measured when the lower sensor ball 36 is touching the ground directly above the buried object. Alternatively, the distance to the buried object can be measured when the lower sensor ball 36 is not touching the ground. It will be understood by those skilled in the art that the system 30 need not have depth measuring capability, in which case a single antenna array such as 44 would suffice, but as a practical matter, a commercially viable sonde and line locator needs to include a depth measuring capability. It may be possible to mount the upper antenna or antenna array 46 inside the housing 32 instead of on the elongate member, but this may subject the antenna or array to excessive noise from the microelectronic circuitry on the circuit boards 80, 90 and 102 (FIG. 6).

There are two ways that the system 30 can measure and indicate the depth of the buried object. It can indicate real time depth continuously in the bottom left corner of the display 48 at 140 (FIG. 7). Alternatively, by pressing and releasing the DOWN key 166 (FIG. 8) the display 48 will indicate in large numbers in the center thereof a "count down" from four seconds, second by second. During this count down the system 30 will measure the depth and average the measurements, and finally display the average depth in the lower left hand corner of the display 48 at 140.

The system 30 displays the overhead indicator 144 (FIG. 7) on the LCD 48 if the upper antenna array 46 receives more signal than the lower antenna array 44. Typically this tells the operator that an overhead source of electromagnetic signal is present, such as an overhead AC power line. Negative depths can be indicated by illuminating the overhead indicator rather than a single negative number.

Pressing the UP key 164 (FIG. 8) when the system 30 is in the SEARCH or MAP view will save the current signal strength to temporary memory and hold the same until the system 30 is turned OFF. This value is displayed at location 148 (FIG. 7) on the display 48 when in the SEARCH view. If the operator saves the current signal strength while in the MAP view he or she will need to switch to the SEARCH view in order to see the same. This feature can be used to compare the signal strength of the two poles when locating a sonde. A level sonde under level ground will have the same signal strength at each pole. If the sonde is inclined, the upward tilting end will be read as a higher signal strength. If the sonde is near a transition in a pipe type, e.g. going from ABS plastic to cast iron, the cast iron end of the pipe may be read as a lower signal strength.

The system 30 indicates the relative current strength at 156 (FIG. 7) on the display 48. This helps the operator see any drop in signal strength that may indicate a junction in the line or if the line splits. The current signal strength also verifies that the correct line is being traced as signal strength may bleed over to shallower lines. These shallower lines may be read as having similar signal strength but the current strength may be lower.

At the beginning of the effort to locate a buried object with the system 30 it is helpful to have the system 30 read "0.0" for the starting point. Due to other interference signals this may not be the case. The temporary zero set command is a valuable tool that can be used for single locate environments where there is some interference present. This helps the system 30 sense only that signal that is emitted by the sonde or line since it zeroes out the other signals before the sonde or line transmitter is turned ON. When the sonde or line transmitter signal is turned ON then the apparent sensitivity will be set to read only that signal.

The system 30 can also be set to read 1000 when directly over the buried object. This gives the operator a maximum signal strength value that can simplify tracing. The 1000 set feature references the current signal level to the displayed value of 1000 and re-maps the sensitivity of the circuit to represent the range of signals between the reference level stored at the zero set, and the reference at the 1000 set to the numerically displayed range of 0 to 1000. During a line trace the 1000 set feature makes it easier for the operator to stay on the line and also see changes in signal level. Signal strength varies as the line depth changes. If the line splits the signal strength drops since a portion of the signal then travels along one leg of the split and the remaining portion travels along the other leg. For example if the displayed signal strength has dropped to 500 the measured signal has dropped by fifty percent.

The system 30 permits the signal strength value for the frequency of interest in different modes to be temporarily set to zero or permanently set to zero. The permanent zero set feature allows the operator to adjust the minimum level of electromagnetic signal that will be shown on the display 48. This allows the system 30 to effectively disregard signals smaller than the consistent ambient noise level. It is useful to have the system read "0.0" when no signal is present as a starting out point or base line. Some operators will prefer maximum sensitivity while others prefer to only show signal when it is strong and well above any interfering noise signals. Environmental noise may be very high in industrial areas and very low in rural areas. The permanent zero set feature allows the operator to effectively tune the system 30 to work in optimal fashion in a given environment and to meet the operator's personal preferences. Typically the user would take the system 30 to a "quiet spot" on the site, with no signal present, and then adjust the signal strength to "0.0". Then any signals larger than this will be read and indicated as some larger value.

The system 30 also indicates an icon in the form of a globe 194 (FIGS. 7, 11, 12 and 13) in which the measured field angle is indicated as being located on the pole if it is at ninety degrees and indicated as being on the equator if it is at zero degrees.

Figure 15:
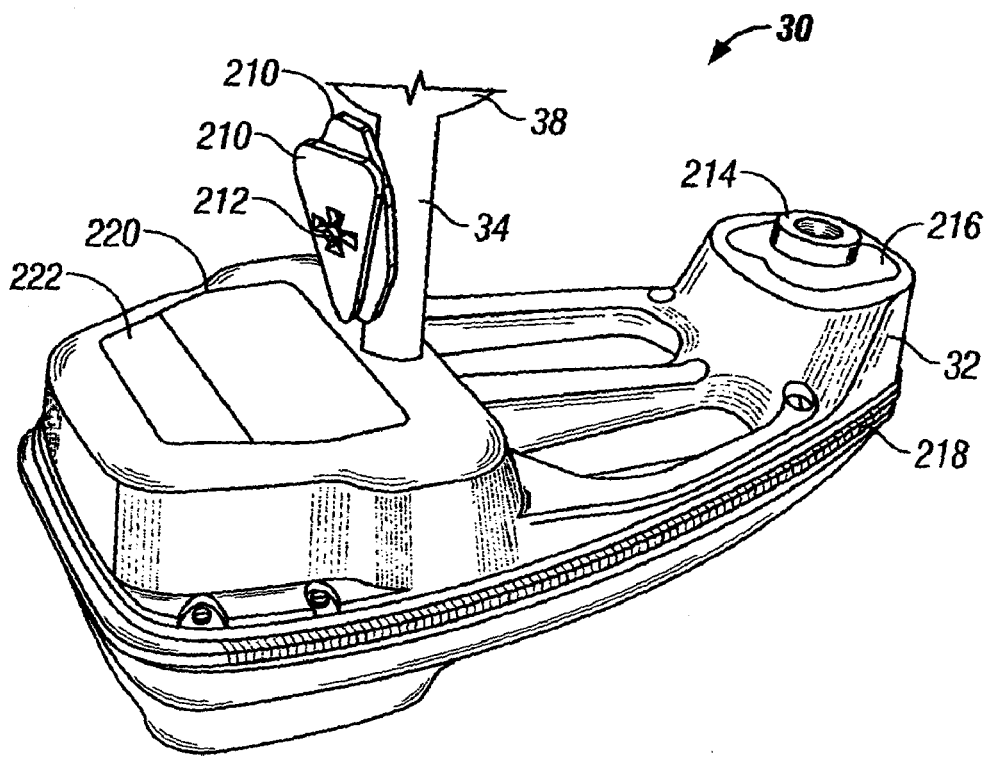
FIG. 15 is an enlarged view of the underside of the housing of the first embodiment.

A plurality of brightly colored plastic marker chips 210 (FIG. 15) are removeably mounted on a post 212 that extends from the elongate member 34, directly beneath the housing 32. These marker chips 210 can be removed and placed on the ground to facilitate the process of locating a sonde or tracing a line with the system 30. The marker chips 210 have starred apertures with deflectable fingers that allow them to snap fit over a flared outer end of the post 212. The inner end of the post 212 can be secured to the elongate member 34 in any suitable fashion, such as with a molded plastic U-shaped clamp (not shown). The clamp snaps on the elongate member 34 and can slide and rotate. Preferably, there are two orange triangular shaped marker chips 210 that can be placed on the ground to mark the poles, and a single yellow octagonal marker chip 210 that can be placed on the ground to mark the location of the sonde. A knob 214 can be rotated counter clockwise to remove a door 216 that covers the compartment for the batteries 118. A synthetic rubber bumper 218 surrounds the housing 32. A helpful icon reference label 220 is affixed to the underside of the housing 32. A serial number label 222 also affixed to the underside of the housing 32 bears a unique number and bar code that identifies the specific system 30 from all similar systems that have been manufactured.

From the foregoing detailed description it will also be appreciated that the present invention also provides a method of locating a buried object by sensing an electromagnetic signal emitted by the buried object. Broadly, the method includes an initial step of traversing a topside area beneath which an object emitting the electromagnetic signal is buried with at least one antenna array 44 including three substantially mutually orthogonal antennas. The method further includes the step of sensing the electromagnetic signal emitted by the buried object with the array 44. The method also includes the step of determining a location of the buried object based on the sensed electromagnetic signal without having to align the antenna array 44 relative to the buried object while eliminating nulls 24 and 26 (FIG. 1) and false peaks 18 and 20. In order to measure depth, while avoiding a null detection, the topside area is simultaneously traversed with the second antenna array 46 that includes at least a pair of antennas.

In order for the system 30 to correctly sense the total field vector, the response of each coil within each of the arrays 44 and 46 needs to be calibrated with respect to the response of the other two coils within the same array. The geometry of the antenna arrays 44 and 46 and the manner in which they are mounted to the elongate member 34 greatly facilitates the calibration of the system 30. Conventional sonde and line locators typically have at least one antenna in their array that has an axis that is substantially in alignment with part of the supporting structure. If any one of the antennas in the array has its axis orthogonal to the axis of the calibrating field, then it is not possible to calibrate that antenna as its response will be nominally zero. The system 30 has a preferable geometry where each antenna has substantially the same offset angle relative to the axis of the elongate member or antenna mast 34. This makes it possible to calibrate each of the three antennas in each array relative to the other two antennas in the same array. This can be done by placing the system 30 within a tubular solenoid field. The two antenna arrays 44 and 46 need to be very accurately aligned and centered within the solenoid calibration field. The solenoid field must be substantially cylindrical so that a uniform, rotationally symmetric calibration field is generated. Making the antenna arrays 44 and 46 spherical and enclosing them in the sensor balls 36 and 38 allows a fixture to be constructed for readily centering the calibration field relative to the elongate member or antenna mast 34. Furthermore, making the antenna arrays 44 and 46 relatively small and round, and precisely centering these antenna arrays on the elongate member 34 minimizes the mass of the shielding required on the calibration chamber.

Figure 16:
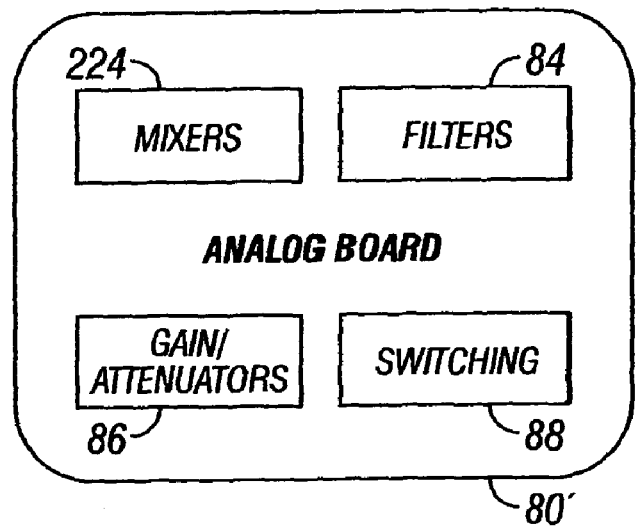
FIG. 16 is a functional block diagram of the analog board of the electronic circuitry of a second embodiment of our portable battery powered sonde and line locator that is designed to simultaneously sense and display the location of a plurality of buried objects at the same time.
Figure 17:
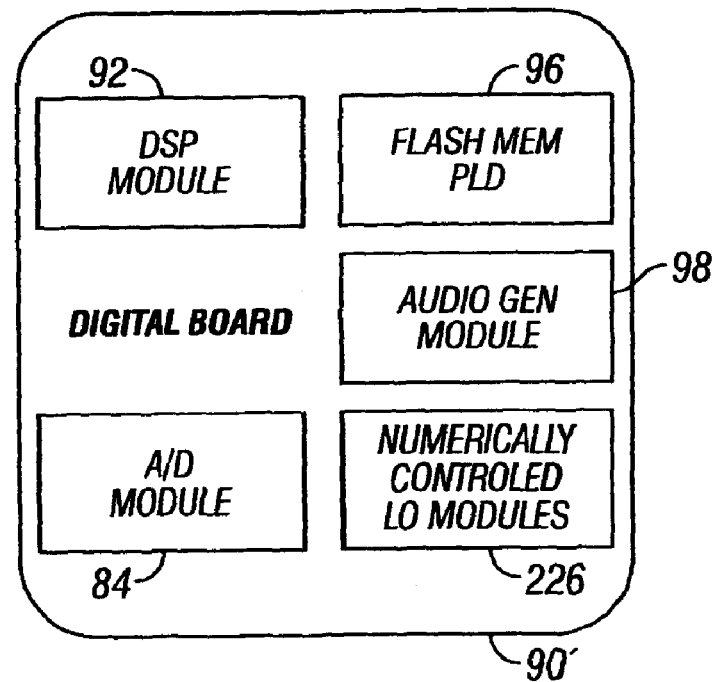
FIG. 17 is a functional block diagram of the digital board of the electronic circuitry of the second embodiment.

FIG. 16 is a functional block diagram of the analog board 80' of the electronic circuitry of a second embodiment of our portable battery powered sonde and line locator that is designed to simultaneously sense and display the location of a plurality of buried objects at the same time. It is similar to the analog board 80 of the first embodiment 30 except that the former includes more mixers 224 for processing the various signals in different frequency bands that are received by all of the antennas. FIG. 17 is a functional block diagram of the digital board 90' of the electronic circuitry of the second embodiment. It is similar to the digital board 90 of the first embodiment 30 except that the former includes a plurality of numerically controlled local oscillator (LO) modules 226 that send a plurality of output signals to the analog board 80'. The modified digital board 90' receives amplified and filtered signals from the antenna coils of the lower and upper antenna arrays 44 and 46 in a fashion similar to that of the digital board 90, except that the former is simultaneously processing signals generated in different frequency bands.

The second embodiment allows the user to seek and locate electromagnetic signals emitted by different buried objects at different frequencies. Preferably the second embodiment allows the user to select between different frequency bands separated by orders of magnitude, e.g. frequency bands centered on 100 Hz, 1 kHz, 10 kHz and 100 kHz, and within different channels within the bands. Preferably, the channels within each band are separated by some uniform amount, e.g. 10 Hz or 100 Hz.

The mechanical and electro-mechanical aspects of the second embodiment are similar to those of the first embodiment illustrated in FIG. 2 except as otherwise indicated hereafter. Throughout this description like reference numerals refer to like parts. The software of the second embodiment is designed to enable a plurality of different buried objects to be simultaneously detected and their locations and depths simultaneously indicated visually and/or audibly.

Figure 18:
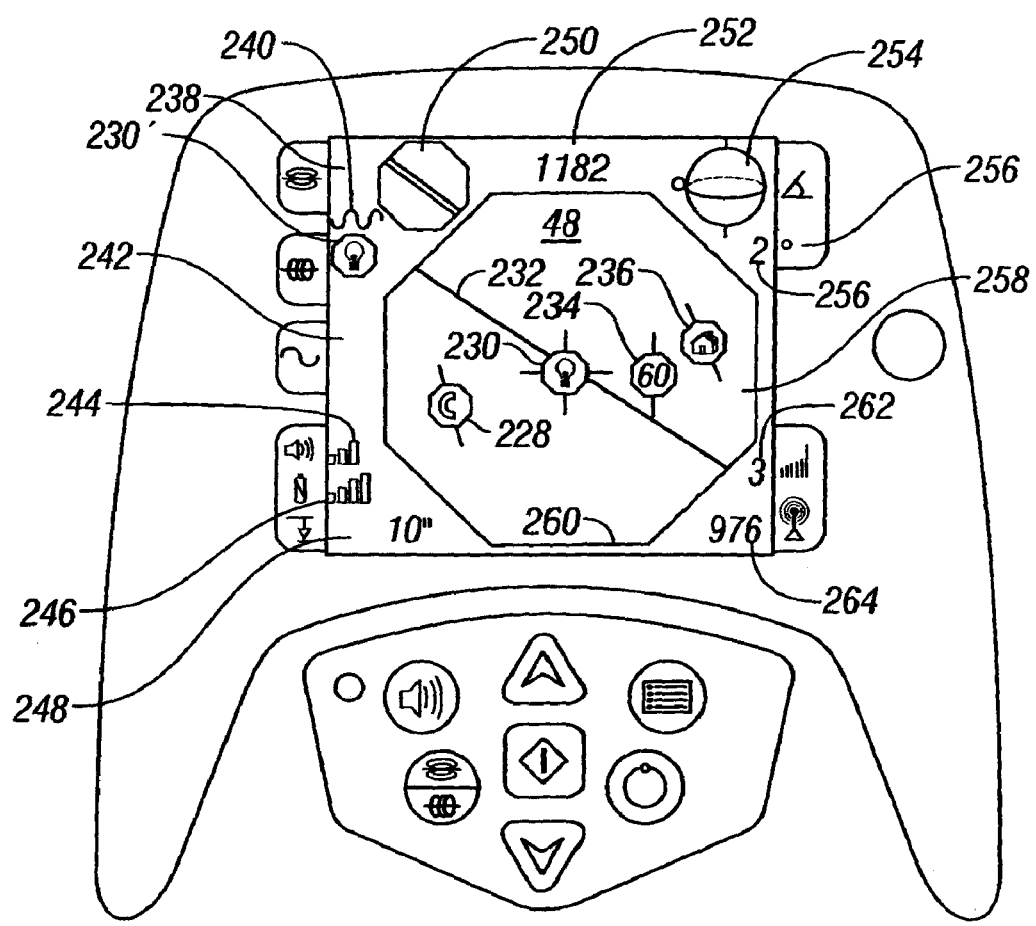
FIG. 18 is an enlarged top plan view of a portion of the housing of the second embodiment illustrating its display and keypad and showing an exemplary trace mode MAP view in which the locations of a plurality of different underground utilities are simultaneously visually indicated.
Figure 19:
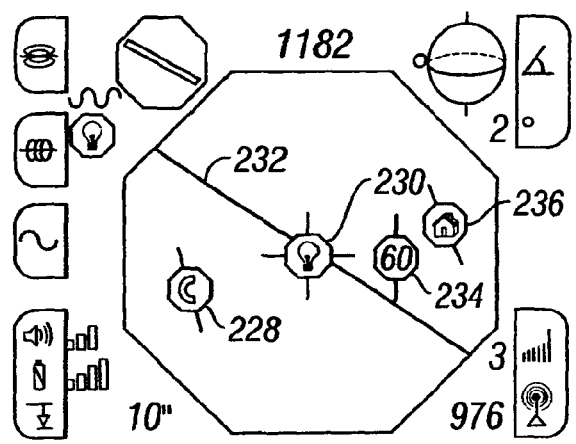
FIGS. 19-22 are additional exemplary trace mode MAP views that can be indicated on the display of the second embodiment.
Figure 20:
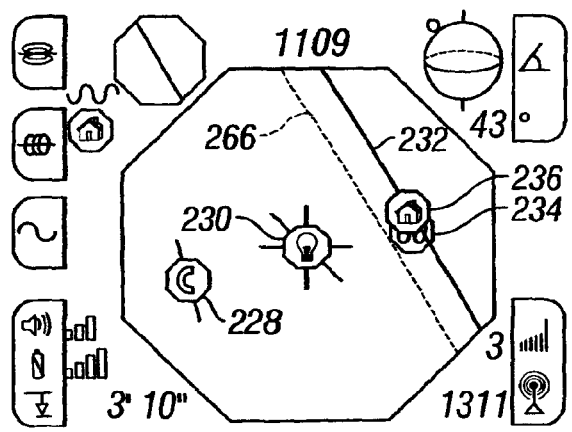
Figure 21:
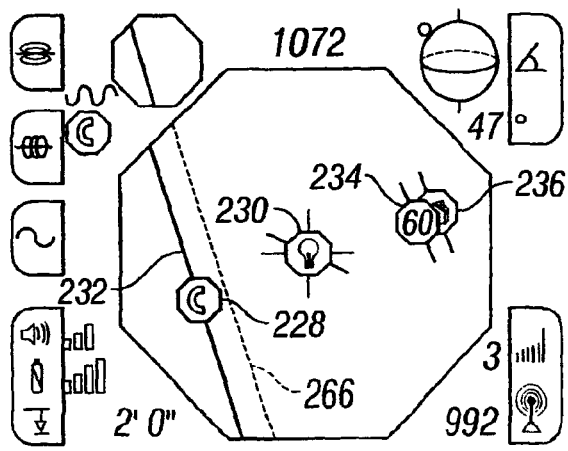
Figure 22:
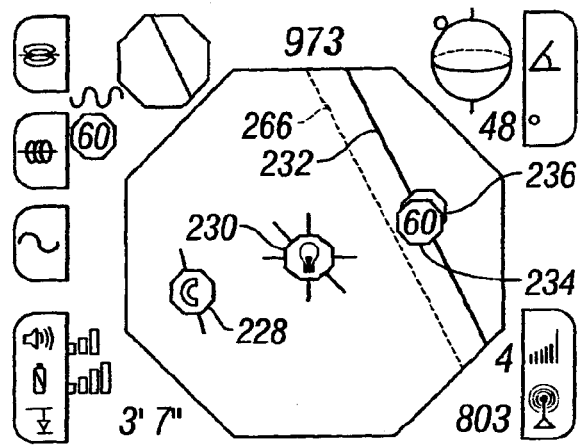

FIG. 18 is an enlarged top plan view of a portion of the housing 32 of the second embodiment illustrating its display 48 and keypad 106 and showing an exemplary trace mode MAP view in which the locations of a plurality of different underground utilities are simultaneously visually indicated. A phone utility icon 228 is indicated on the display 48 without the line orientation feature selected. An electric utility icon 230 is indicated on the display 48 with the line orientation feature selected and indicated by a solid bold diagonal line 232. A 60 Hz icon 234 is indicated on the display 48 without the line orientation feature selected. A gas utility icon 236 is indicated on the display 48 without the line orientation feature selected.

Continuing with FIG. 18, if a sonde is being used, the sonde frequency and level are indicated at a location 238 in the upper left corner of the display 48. No values for the sonde frequency and level are illustrated in FIG. 18. High, medium and low frequencies are indicated by unique corresponding wave form patterns 240. The icon of the currently selected utility, in this case the electric utility, is shown at 230' in the upper left corner of the display 48. An AC trace level can be indicated at location 242. In FIG. 18, no AC trace level is illustrated. The audio level currently selected on the second embodiment is illustrated by the bar graph 244 on the display 48. The level of the currently selected battery type used in the second embodiment is illustrated by the bar graph 246 on the display 48. The depth or distance of the currently selected utility is indicated on the display at 248 which in the example of FIG. 18 is ten inches. A 3D field indicator is indicated by the octagon 250 and a signal strength for the selected utility is indicated at 252, which in the example of FIG. 18 is 1182. A 2D horizontal field indicator is indicated at 254. The horizontal angle is digitally indicated on the display 48 at 256 which in the example of FIG. 18 is two degrees. A small graphic tab or notch 258 moves clockwise along a large octagonal race track 260 in a clockwise direction to indicate increasing field strength and in a counter-clockwise direction to indicate decreasing field strength. An auto-gain step is digitally indicated at a location 262 which in the example of FIG. 18 is a 3. Finally, a source current level is indicated on the display 48 of the second embodiment at a location 264 which in the example of FIG. 18 is 1999. All highlighted information indicated around the periphery of the display 48 of the second embodiment that pertains to a specific selected utility will change when the selected utility is changed. Different utilities can be selected by pressing the select key 158 in the center of the keypad 106.

FIGS. 19-27 are additional exemplary trace mode MAP views that can be indicated on the display of the second embodiment. FIGS. 19-22 correspond to, and demonstrate how the screen on the display 48 changes as the display "focus" is switched from one utility to the next by actuation of, for example, the select key 158. In the case of FIGS. 19-22 there are a total of four utilities active, one of which is a passive 60 Hz source. The selected utility in each case is shown with a bold line through its icon while the others only show short "tails." The bold line 232 indicates the orientation of the selected utility. The short tails on the non-selected utilities show the approximate orientation of the electromagnetic fields associated with each corresponding sensed frequency. Grey scale or other methods could be used to indicate the unselected utilities. All of the field or signal specific data changes each time a different utility is selected. The indicated field strength, field angles, current and depth are specific to each selected utility. The signal from the upper antenna ball 38 (dashed line 266) also changes in the screens illustrated in FIGS. 20-22. The corresponding one of the icons 228, 230, 234 and 236 is indicated in the upper left corner of the display 48 changes to indicate the currently selected utility.

Besides visual indications of the different locations of the different utilities, the second embodiment can give audible indications such as tones, synthesized human voices, or musical voices. For example, the second embodiment could tell the user "sewer two feet left" then "sewer one foot left" then "above sewer" as the user moves the line locator to the left. The second embodiment could also say "turn right" or "turn left" if the angle between the traced line and the locator is greater than some pre-programmed value. The audible turn indicators could also give the magnitude, e.g. "turn, right, two." Musical voices could include a tuba for sewer, a claxon for electric, etc.

Figure 23:
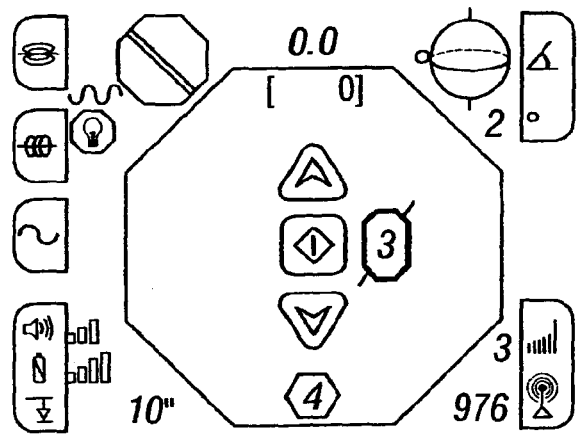
FIG. 23 is a special set up screen that can be indicated on the display of the second embodiment.

FIG. 23 illustrates a special set up screen that can be indicated on the display 48 of the second embodiment. It allows the user to adjust the amount of signal discrimination. If the electromagnetic signal is less than some specified value the signal strength for that utility is indicated as zero. This allows the user to have the display 48 only indicate strong, valid signals. This helps the user in many situations in sorting out "noise" from the target signals of interest. This feature of the second embodiment is similar to the "zero set" feature of the first embodiment except that the former allows the "strength" of the zero set to be varied as needed. Preferably, the second embodiment allows the user to individually set a zero threshold (and also 1000 magnitude set) for each utility separately and individually, and to save this information. It also preferably allows the user to reset each zero at any time during the location process to manage or minimize cross-talk or coupling between different lines. The zero threshold can be used as a criteria or trigger to display or not display any of a plurality of utilities. For example, if the signal strength of the target utility is less than a reference level, and the focus of the locator is set to another utility subchannel, then the second embodiment will not display (or alter the display) of that utility.

Figure 24:
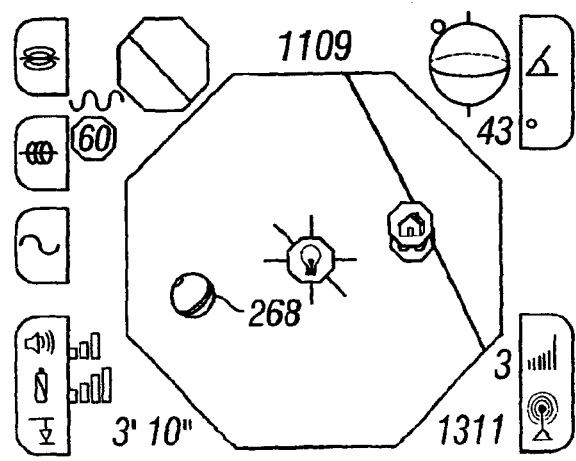
FIGS. 24-27 are additional exemplary trace mode MAP views that can be indicated on the display of the second embodiment.

FIG. 24 illustrates the manner in which the display 48 of the second embodiment indicates the location of a marker ball illustrated by the unique icon 268. Preferably the configuration of the icon 268 can be varied to indicate different types of buried utility makers, also sometimes referred to as marker balls, locator pegs and marker discs.

Figure 25:
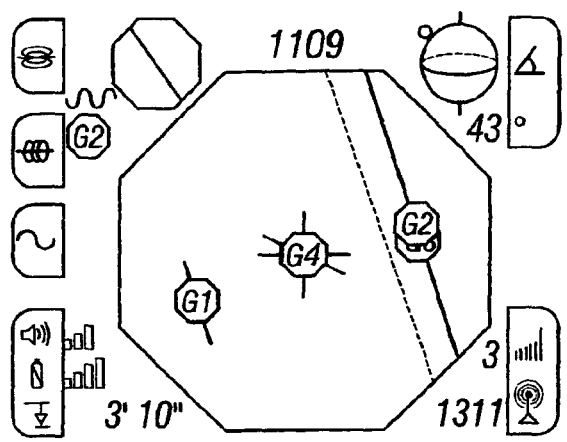

FIG. 25 illustrates an alternate way of indicating different types of utilities on the display 48 of the second embodiment. In this example, the user is tracing multiple gas lines G1, G2, etc. However, the display could also indicate W, G, E, etc. for water, gas, electric, and so forth. Simple numerals like 1, 2, 3, etc. could also be used.

Figure 26:
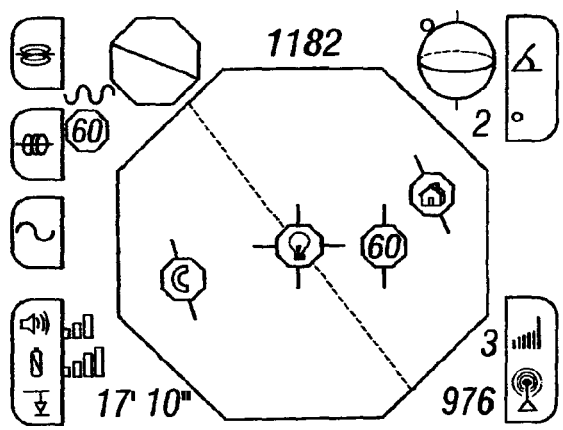

FIG. 26 illustrates the manner in which the second embodiment can change the selected utility trace line from bold to dashed if the measured depth is negative. If the measured depth is negative, the signal source is either above the locator (user) or the signal is highly distorted or perhaps mostly attributable to noise. In any event, the second embodiment preferably has the capability of indicating a measure of uncertainty in how information is displayed to the user.

Figure 27:
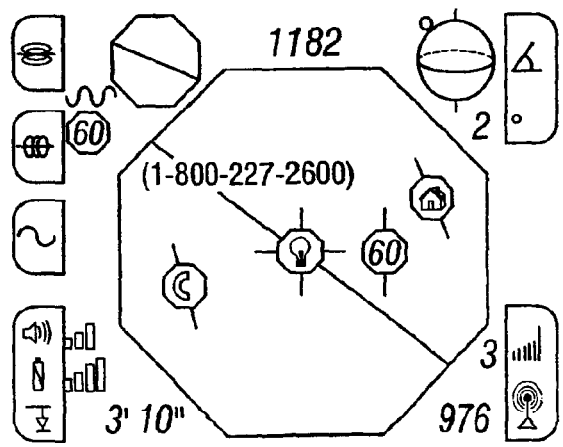

FIG. 27 illustrates the manner in which the second embodiment can indicate information encoded on trace signals placed on utilities. In this example an 800 phone number has been detected and indicated on the display 48.

Figure 28:
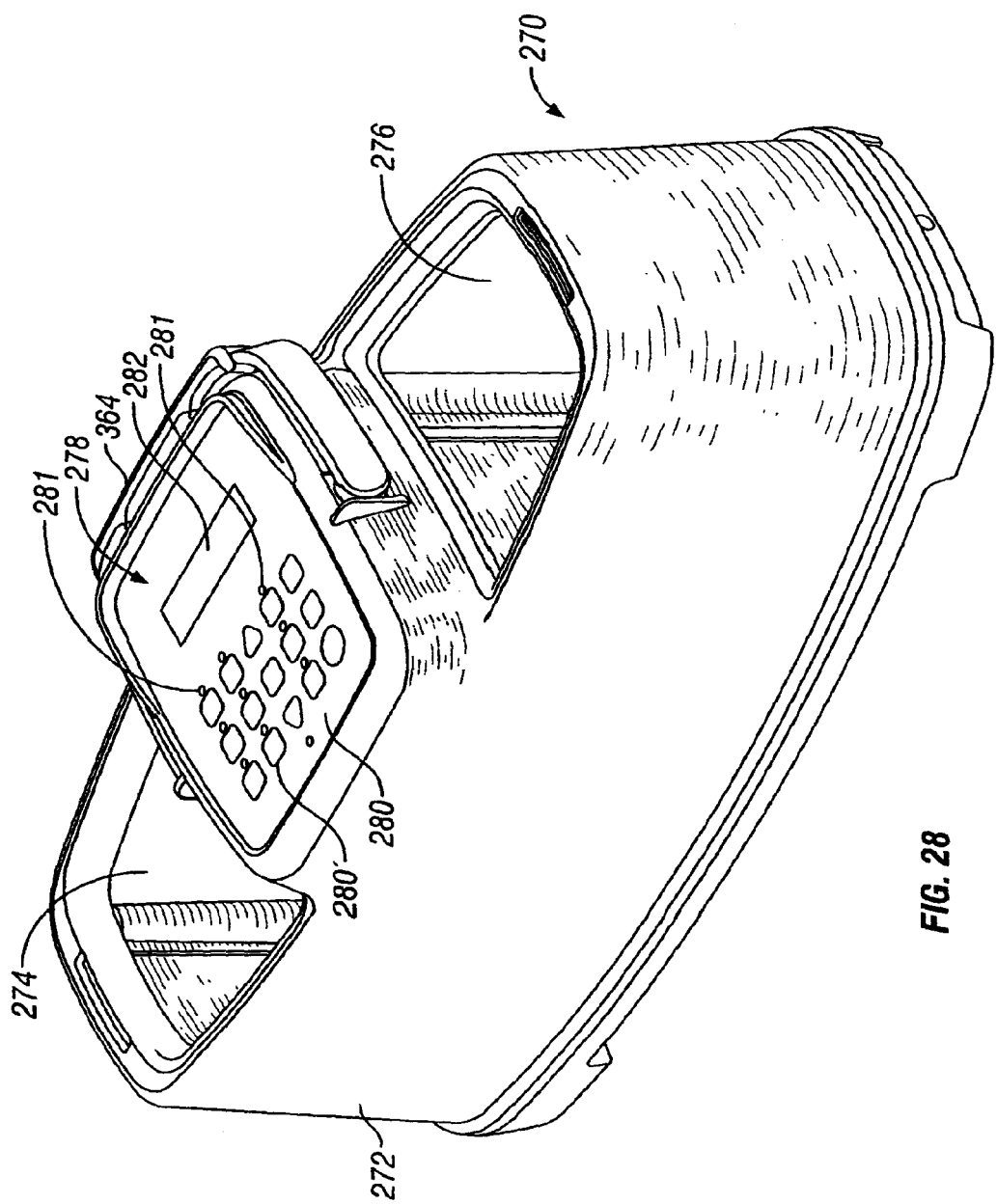
FIG. 28 is a perspective view from the top side of a portable transmitter that can be used with either the first embodiment or the second embodiment of our portable sonde and line locator. The pair coil cords and their respective clips that are normally stowed in the pockets at opposite ends of the transmitter during transport are not illustrated in this view.

FIG. 28 is a perspective view from the top side of a portable transmitter 270 that can be used with either the first embodiment or the second embodiment of our portable sonde and line locator. It will be understood that a user will need several transmitters of this type to energize each different utility with the appropriate electric signal. The transmitter 270 includes a hollow molded plastic portable housing 272 preferably having a pair of outwardly and upwardly opening receptacles or pockets 274 and 276 at opposite ends thereof. A horizontal control panel 278 is mounted on the top side of the housing 272 for receiving manually inputted commands. The control panel 278 includes a membrane type keypad 280 with a plurality of individual pushbutton keys 280'. The control panel 278 further includes a plurality of individual colored LEDs 281, many of which are associated with a particular one of the keys 280. Additional LEDs 280 on the control panel 278 are not associated with a particular key 280 but will indicate a warning or status conditions such as the presence of high voltage at the output coupling. An LCD display 282 also forms a part of the control panel 278. On the control panel 278 of the transmitter 270, the manual selection of different frequencies for activating and tracing various utility lines follows the colors normally associated with particular types of utilities. Electricity is indicated by an illuminated red LED, gas is indicated by an illuminated yellow LED, sewer is indicated by an illuminated green LED, water is indicated by an illuminated blue LED and communications is indicated by an illuminated orange LED.

Figure 35:
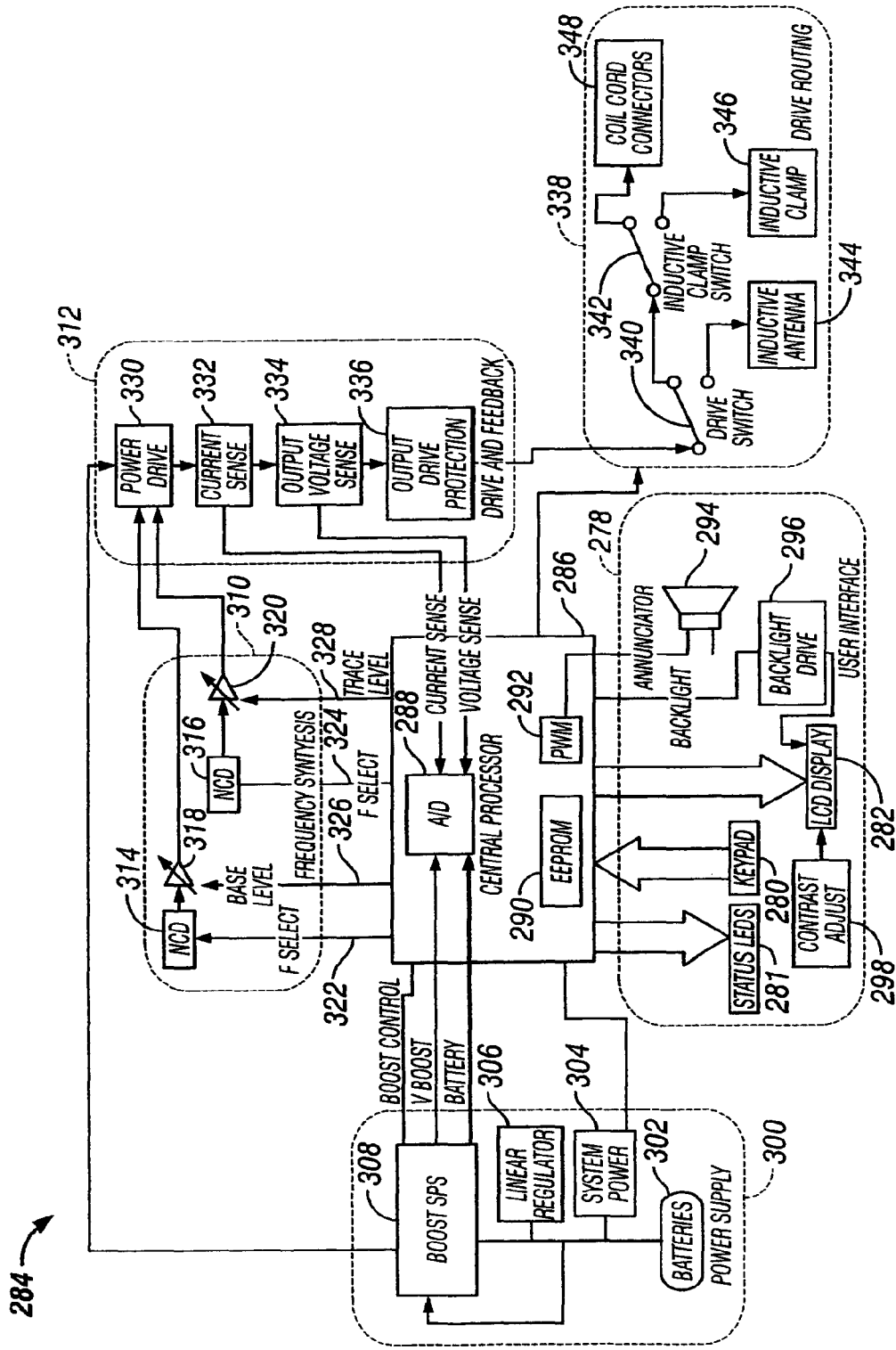
FIG. 35 is a functional block diagram of the electronic circuitry of the transmitter of FIG. 28.

An electronic circuit 284 illustrated in block diagram form in FIG. 35 is physically supported on one or more printed circuit boards (not illustrated) mounted inside the housing 272 (FIG. 28). The electronic circuit 284 receives commands from the control panel 278 and generates a predetermined electrical output signal in response to the commands. More particularly the electronic circuit 284 of the transmitter 270 allows the user to select from a plurality of frequency bands each separated by an order of magnitude, and then from a plurality or cluster of signals within those bands. By way of example, the frequency bands may be centered on 100 Hz, 1 kHz, 10 kHz and 100 kHz. The channels within each band are stepped or spaced suitable equal intervals apart, such as 10 Hz, to allow them to be readily discriminated, as is well known in the art. Preferably the electronic circuit 284 is also able to generate very high frequency signal, such as 480 kHz, for specialized tracing activities. The second embodiment of the locator can be programmed to seek this frequency. The transmitter 270 can also generate single frequencies not spaced apart by orders of magnitude.

Referring to FIG. 35, the electronic circuit 284 of the transmitter 270 includes a central processor circuit 286 including A/D converter 288, EEPROM 290 and a pulse width modulator (PWM) 292 for generating the audio drive signal for a buzzer type annunciator 294. The central processor circuit 286 drives the LCD display 282 and the backlight drive 296 for the display 282. The electronic circuit 284 also includes a contrast adjust circuit 298.

The electronic circuit 284 of the transmitter 270 further includes a power supply 300 having a plurality of replaceable batteries 302, such as eight C type alkaline cells. The central processor circuit 286 receives power from the power supply 300 via a linear regulator circuit 306. The central processor circuit 286 controls power to the rest of the system by switching a system power circuit 304. The central processor circuit 286 also controls a boost switching power supply (SPS) 308 to set a variable output voltage (Vboost) which is fed to a power drive circuit 330. The voltage at the batteries 302 and optionally the output of the boost SPS 308 are fed to the A/D converter 288 to measure battery voltage in order to estimate remaining battery power and boost voltage. A frequency synthesis circuit 310 is connected between the central processor circuit 286 and a drive and feedback circuit 312. The frequency synthesis circuit includes a first numerically controlled oscillator (NCO) circuit 314 that generates a base frequency and a second numerically controlled oscillator (NCO) circuit 316 that generates a so-called "sniff" frequency to facilitate location. By way of example, the sniff frequency may be a very high frequency, such as 480 kHz. The outputs of the first NCO circuit 314 and the second NCO circuit 316 may be adjusted through variable amplifiers 318 and 320, respectively. The central processor circuit 286 controls the NCO circuits 314 and 316 via Fselect lines 322 and 324, respectively. The central processor circuit 286 controls the variable amplifier 318 via base level line 326 and controls the variable amplifier 320 via trace level line 328.

The drive and feedback circuit 312 includes the power drive circuit 330 that receives an electric signal with a preselected voltage directly from the boost SPS circuit 308 and the amplified signals from the NCO circuits 314 and 316 and the variable amplifiers 318 and 320. The output signal of the power drive circuit 330 is fed through a current sense circuit 332 that provides an output sense voltage proportional to the drive current. This sense voltage is fed to the A/D converter 288 to measure the current. The power drive signal is then fed to an output voltage sense circuit 334 which provides an output sense voltage proportional to the drive voltage. This sense voltage is fed to the A/D converter 288 to measure the output voltage. The current sense and voltage sense signals are used to determine the power being delivered to the load. The power drive signal is then fed through an output drive protection circuit 336 which protects the drive and feedback circuits 312 from be damaged by connection to an external power source such as a live high voltage wire. The output drive protection circuit 336 contains a fuse as well as filtering and clamping circuits. The power drive signal is then fed from the output drive protection circuit 336 into a drive routing circuit 338 that includes manually actuated drive and inductive clamp switches 340 and 342 that allow the final output signal of the electronic circuit 284 of the transmitter 270 to be coupled to a selected utility via coupling means such as an inductive antenna 344, an inductive clamp 346 or a coil cord connector 348.

Figure 29:
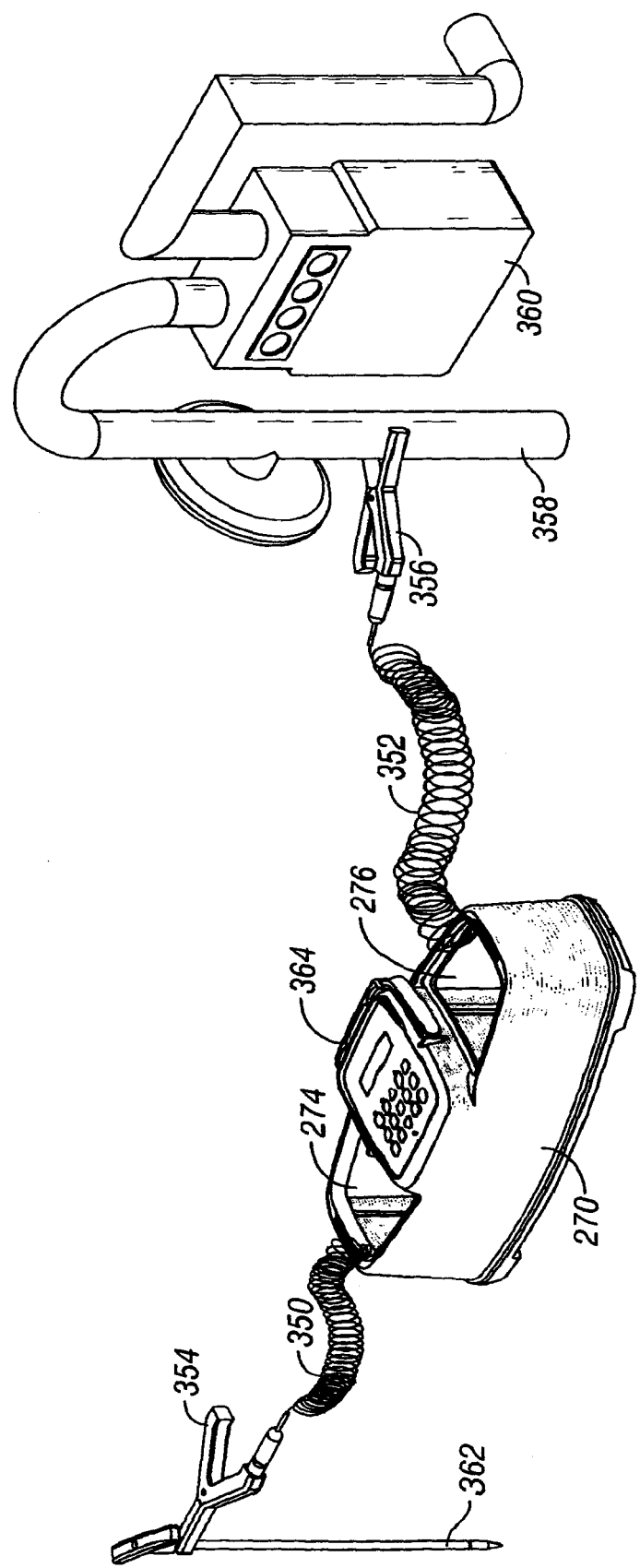
FIG. 29 is a reduced perspective view of the transmitter illustrating the coupling of one of its clips to a ground spike and the coupling of the other clip to a gas pipe extending from a gas meter.

Referring to FIG. 29, in one configuration of the transmitter 270 a pair of electrical cords 350 and 352 are each stowable in a corresponding one of the pockets 274 and 276. The electrical cords each have a conductor with an inner end that is electrically connected to the electronic circuit 284. Preferably the electrical cords 350 and 352 are of the springy helical coil type that readily stretch and contract. The cords 350 and 352 should be as small and lightweight as possible so that their lengths can be maximized and they will still fit within their respective pockets 274 and 276. We have found that the inner conductors of the coil cords 350 and 352 which are covered with plastic insulation can be made of steel instead of the usual Copper found in such cords. Steel is much stronger than Copper and therefore the conductors can be made smaller. The higher electrical resistance is acceptable in a transmitter application as the resistance of the types of circuits (utilities) to which the transmitter 270 will typically be connected is high.

Referring still to FIG. 29, alligator style clips 354 and 356 with spring biased opposing electrically conductive jaws are electrically connected to the outer ends of the conductors in each of the electrical cords 350 and 352 for coupling the predetermined electrical signal across a selected utility line which, in FIG. 29, is a gas line 358. The gas line 358 joins with an above-ground gas meter 360 and a majority of its length extends underground. The alligator clip 356 is connected to the conductor of the coil cord 352 which is in turn connected to the positive electrical output signal of the electronic circuit 284 via the drive routing circuit 338. The alligator clip 356 is clamped around the gas line 358 to energize the same so that it emits electromagnetic radiation at the desired frequency for optimum tracing. The other alligator clip 354 is connected to the outer end of the conductor of the coil cord 350 which is in turn connected to the ground side of the electronic circuit 284. The alligator clip 354 is clamped around the upper portion of a T-shaped steel ground spike 362 that is driven into the soil to complete the circuit across the gas line 358.

FIG. 29 also illustrates a pivotal handle 364 of the transmitter in its raised position. The handle 364 is generally U-shaped and the lower ends of its legs are pivotally connected to opposite sides of the housing 272 near the control panel 278. The intermediate segment of the handle 364 can be grasped by a user to lift and carry the transmitter 270 to the location of the above-ground portion of the utility that is to be energized.

Figure 30:
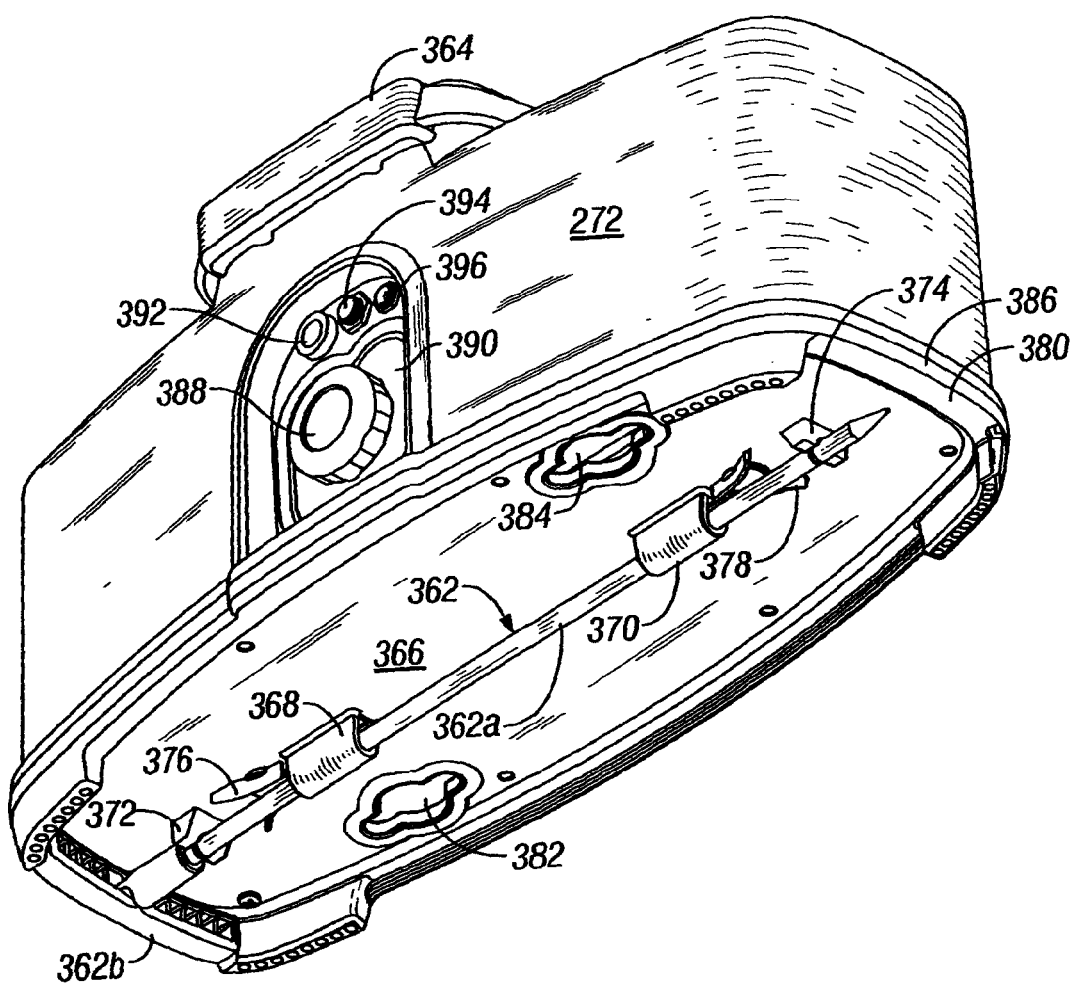
FIG. 30 is a perspective view from the bottom side of the transmitter illustrating the removable mounting of the ground spike to the underside thereof.

FIG. 30 is a perspective view from the bottom side of the transmitter 270 illustrating the removable mounting of the ground spike 362 thereto. A removable bottom wall 366 of the housing 272 has a pair of spaced apart sleeves 368 and 370 formed therein which slidingly receive the pointed round shaft portion 362*a* of the ground spike 362. A pair of shoulders 372 and 374 are also formed on the bottom wall 366 adjacent the sleeves 368 and 370, respectively. The shaft portion 362*a* rides over the shoulders 372 and 374 to provide a snug fit. Curved pairs of opposing guide walls 376 and 378 are connected to the bottom wall 366 before the first sleeve 368 and after the second sleeve 370 so that the ground spike 362 can be inserted from either end of the housing 272 and the handle portion 362*b* thereof will be received in one of the conformably shaped handle receiving slots such as 380 formed at either end of the housing 272. The pointed shaft portion 362*a* of the ground spike 362 is preferably made of steel while the handle portion 362*b* is preferably molded from plastic and rigidly secured to the blunt end of the shaft portion 362*a*. The bottom wall 366 of the housing 272 of the transmitter 270 is formed with a pair of diagonally located keyhole shaped apertures 382 and 384 that allow a bicycle or other locking cable to be passed through one of the pockets 274 and 276 to lock the transmitter 270 to a gas pipe or other fixture to prevent the transmitter from being stolen. A gasket or boot 386 made of a suitable elastomer such as synthetic rubber surrounds the base of the housing 272 and provides a water tight seal between the removable bottom wall 366 and the remainder of the housing 272. The boot 386 deforms to allow the handle portion 362*b* of the ground spike 362 to move past the same upon insertion thereof into the sleeves 368 and 370 and helps retain the ground spike 362 in its loaded and stored position illustrated in FIG. 30.

Referring still to FIG. 30, access to the eight C cell alkaline batteries 302 is accomplished by unscrewing a knob 388 to permit removal of a battery compartment cover 390. A removable fuse 392 may be unscrewed and replaced. The fuse is part of the output drive protection circuit 336. A female headphone type jack 394 is provided for the connection of an inductive clamp (not illustrated). A power type jack 396 permits an auxiliary power source to be connected to the electronic circuit 284.

Figure 31:
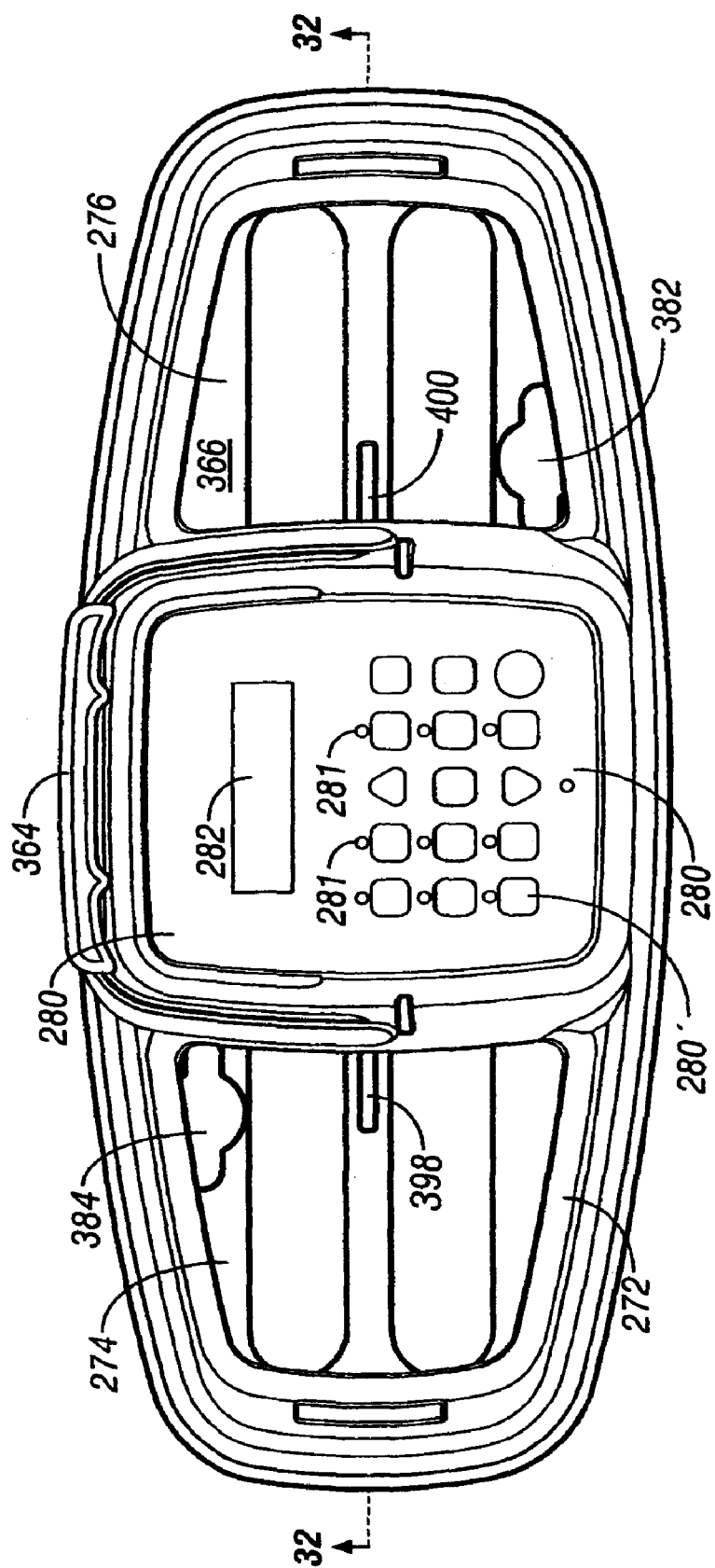
FIG. 31 is a top plan view of the transmitter without its coil cords or clips stowed in the pockets at its opposite ends.

FIG. 31 is a top plan view of the transmitter 270 without its coil cords 350 and 352 or alligator clips stowed in the pockets 274 and 276 at its opposite ends. A pair of drain holes 398 and 400 formed in the bottom wall 366 are visible in this figure.

Figure 32:
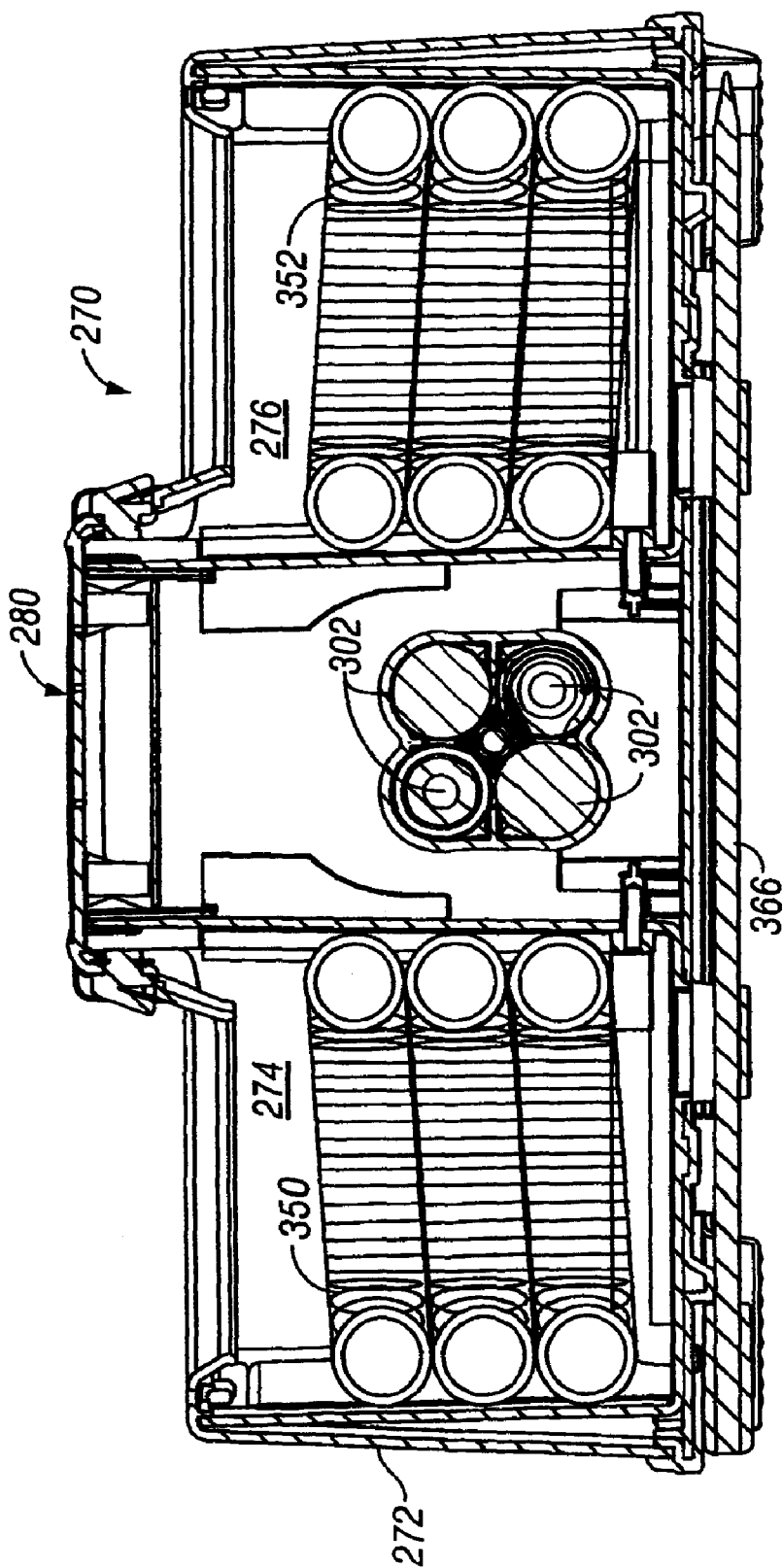
FIG. 32 is an enlarged vertical sectional view of the transmitter taken along line 32-32 of FIG. 31 showing the coil cords stowed in the pockets.

FIG. 32 is an enlarged sectional view of the transmitter taken along line 32-32 of FIG. 31 showing the coil cords 350 and 352 stowed in the pockets 274 and 276, respectively. Four of the C cell batteries 302 are also visible in this figure.

Figure 33:
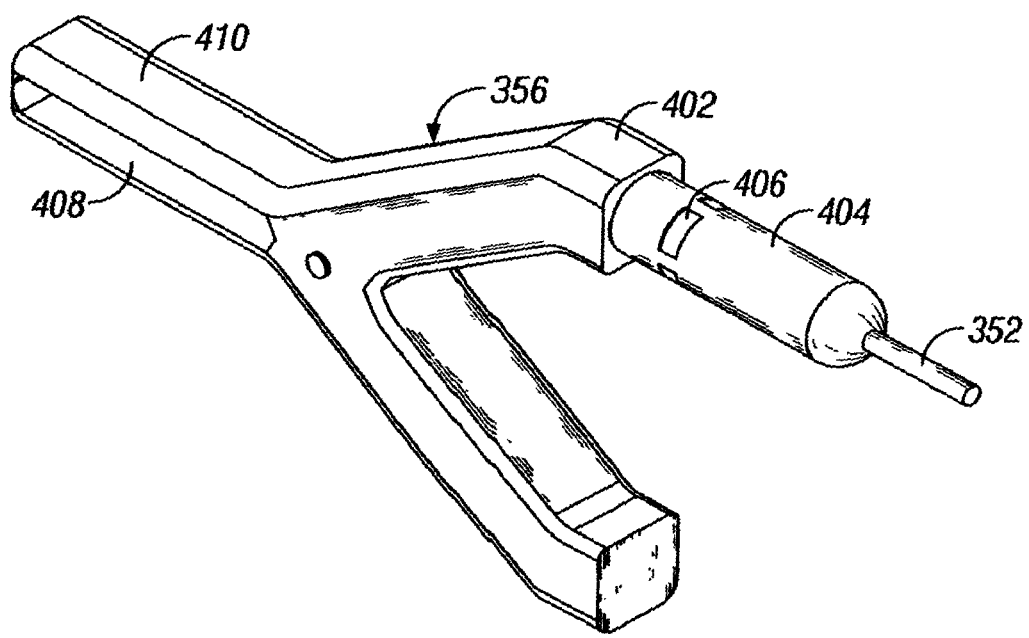
FIG. 33 is an enlarged perspective view of one of the alligator clips of the transmitter that is used to couple a coil cord to a pipe or other conductor.
Figure 34:
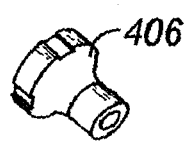
FIG. 34 is an enlarged perspective view of a light pipe used in the clip of FIG. 33.

FIG. 33 is an enlarged perspective view of one of the alligator clips 356 of the transmitter 270 that is used to couple the coil cord 352 to the gas pipe 358. One of the jaw handles 402 is provided with a cylindrical over-molding 404 that houses and protects one or more LEDs and supporting circuitry hereafter described. The illumination from these LEDs is made visible by means of light pipe 406. Illumination from these LEDs provides visual feedback to the user that the line or cable to which the jaws 408 and 410 have been clamped is receiving the output signal of the transmitter 270. FIG. 34 is an enlarged perspective view of one configuration for the light pipe 406 used in the alligator clip 356 illustrated in FIG. 33 that enables three hundred sixty degree viewing. This configuration can only accept one LED at a time but the light pipe could be modified to receive and transmit the light from a plurality of LEDs simultaneously.

Figure 36:
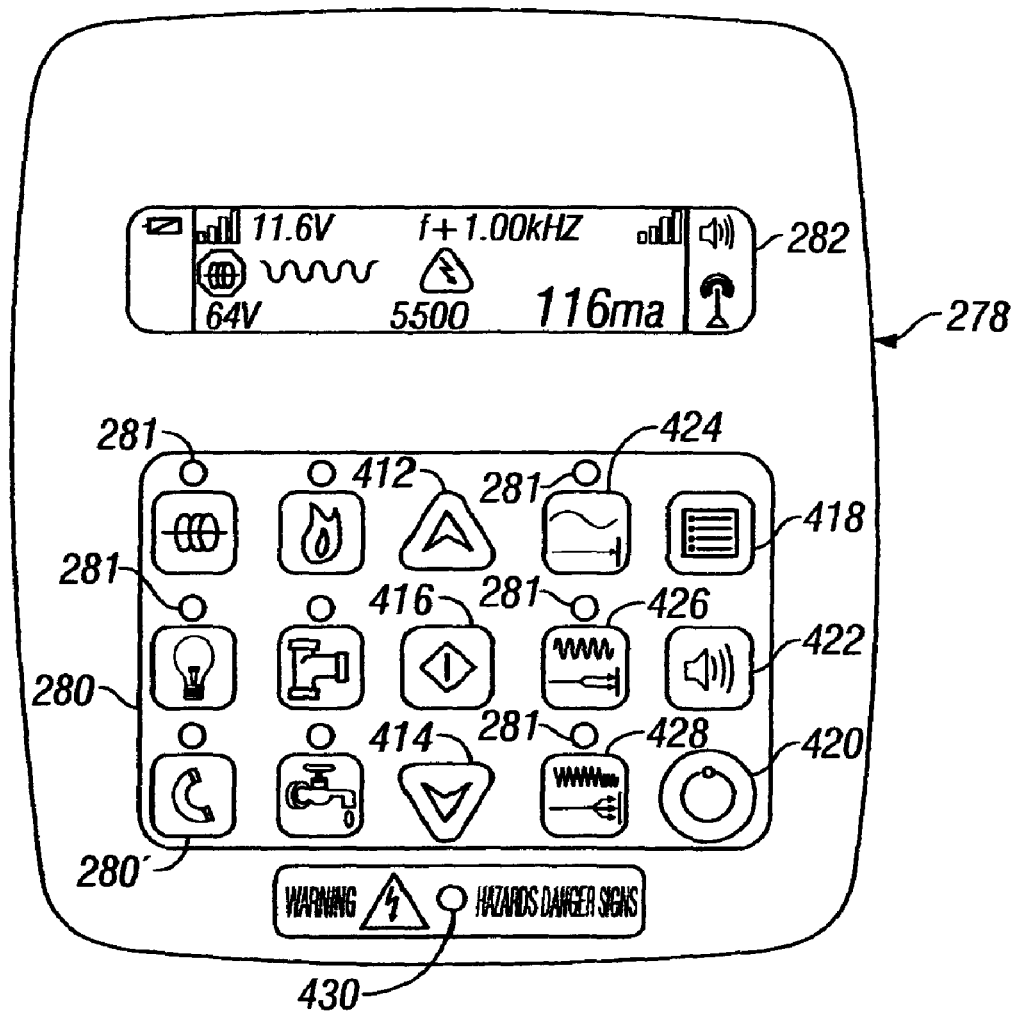
FIG. 36 is an enlarged view of the display screen and keypad of the transmitter of FIG. 28.

FIG. 36 is an enlarged view of the control panel 278 of the transmitter 270 illustrating details of its display screen 282 and its keypad 280 of the transmitter 270. The keypad 280 has a number keys or pushbuttons that can be manually depressed by the user to select options and execute various commands. The keypad 280 includes UP, DOWN and SELECT pushbuttons 412, 414 and 416, respectively. There are six different pushbuttons with graphics for six different types of utilities, each having an associated LED 281 of the appropriate color which is illuminated when that pushbutton is depressed. The reference numeral 280' and its lead line point to the pushbutton for selection of the communications utility. A menu key 418 opens and closes the main menu, selections from which are indicated on the display 282 and may be scrolled through and selected via actuation of pushbuttons 412, 414 and 416. A power ON/OFF pushbutton 420 allows the transmitter 270 to be turned ON and OFF. A sound pushbutton 422 opens and closes the sound level menu. The control panel 278 also has three frequency mode selection pushbuttons 424, 426 and 428 situated in a vertical row to the right of the UP, DOWN and SELECT pushbuttons 412, 414 and 416. Finally the control panel has a separate warning LED 430 that is illuminated to warn the user that a hazardous voltage is present. The central processor circuit 286 has all the intelligence and programming for providing a user friendly graphical user interface (GUI) on the LCD display 282, one example of which is illustrated in FIG. 36.

Figure 37:
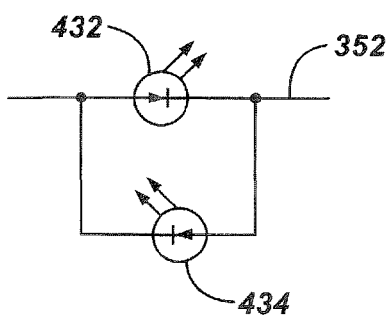
FIGS. 37-40 are schematic diagrams of several alternate embodiments of the LED circuit in the one of the alligator clips of the transmitter.
Figure 38:
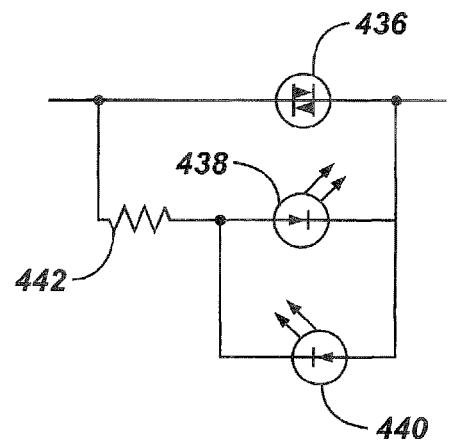
Figure 39:
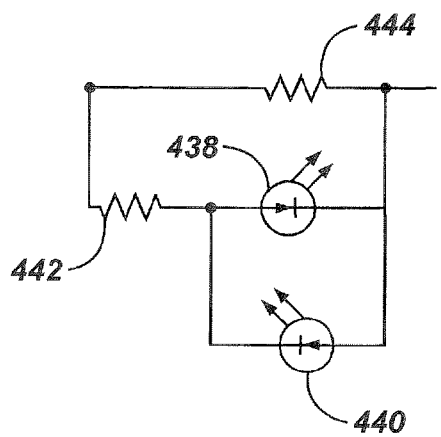
Figure 40:
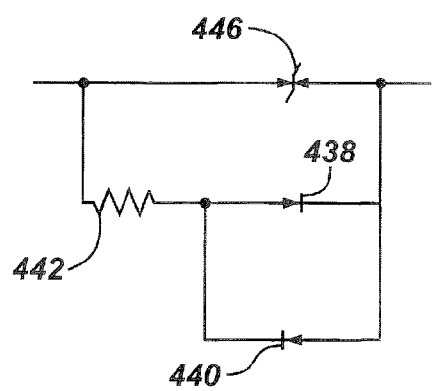

FIGS. 37-40 are schematic diagrams of several alternate embodiments of the LED circuit in the alligator clip 356 of the transmitter 270. In the circuit of FIG. 37 two LEDs 432 and 434 are oppositely oriented and connected in parallel. The LED 432 is connected in series with the output cable 352. While this circuit provides the brightest illumination, special LEDs are required. In the circuit of FIG. 38 a SIDAC or DIAC 436 is connected in series with the cable 352. Two oppositely oriented LEDs 438 and 440 are connected in parallel with the SIDAC or DIAC 436 through a resistor 442. The circuit of FIG. 39 is similar to the circuit of FIG. 38 except that the SIDAC or DIAC 436 is replaced with a second resistor 444. This is a very low cost option. The circuit of FIG. 40 is similar to that of FIG. 39 except that the second resistor 444 is replaced with a bidirectional zener diode 446. This circuit offers a good compromise between cost and brightness.

While we have described preferred embodiments of an improved sonde and line locator and improved methods of locating buried objects that emit an electromagnetic signal, they can be varied and modified in many ways. For example, the antenna arrays 44 and 46 could each have a ferrite core instead of an air core. Each coil in an array could be split into multiple coils offset from the center line (axis of the elongate member 34). Wiring these multiple coils in series would produce a signal similar to that of a single coil centered about the center line. For example, the multiple coils could be positioned on the flat surfaces of a polyhedron such as an octahedron. Depth measuring capability is not essential so a second antenna array need not be used, or depth could be sensed with only the lower array 44 with three mutually orthogonal antennas and a fourth antenna mounted on the elongate member 34 spaced from the array or within the housing 32. The features and attributes of the GUI including the selectable modes and the SEARCH and MAP views could be widely varied. Audible tones are not absolutely necessary. Conversely, audible tones could be used without any visual display.

Continuing with the description of various modifications to our invention, the physical shape of the housing 32 could be altered as needed. The elongate member 32 that provides the antenna mast need not be a hollow Aluminum or fiberglass tube but could be a solid member with any cross-section molded around the twisted pairs that connect the pre-amps 70 and 78 in the sensor balls 36 and 38 to the analog circuit board 82 mounted in the housing 32. The arrangement and designation of keys on the keypad 106 could be widely varied. The signal from the upper antenna array 46 could be used when the system 30 is at or near one of the sonde poles to indicate the direction to the sonde. Either the first embodiment or the second embodiment of our sonde and line locator could incorporate a GPS receiver for downloading locating data and comparing the same to stored municipal map data to ensure that well known utilities are accounted for before commencing to locate a buried object. The housing 32 can incorporate a bubble level indicating device and an internal two-axis (or more) accelerometer. The bubble level would help the operator locate buried pipes. The output of the accelerometer would help the system 30 correct the presented display information if the operator did not hold the system 30 truly vertical. Further electronics, including the A/D, processors and gain and filtering blocks could be contained in or near the lower and upper sensor balls 36 and 38. The marker chips 210 could be directly mounted to the housing 32.

The second embodiment of our sonde and line locator uses frequency division multiplexing (FDM) to simultaneously sense the different electromagnetic signals emitted by different utilities and to determine their different locations. However those skilled in the art will appreciate that a portable sonde and line locator incorporating the basic concepts of our second embodiment could be designed to operate with other well known multiplexing schemes such as time division multiple access (TDMA) or code division multiple access (CDMA).

The use of three coils represents a minimal solution for measuring the magnitude and direction of the magnetic field emanating from the buried object. There is no requirement that the coils be mutually orthogonal. Mathematically, the coils only need to be linearly independent. That is, the coils need to span the vector space of interest. By way of example, the first embodiment and the second embodiment of our sonde and line locator could incorporate one antenna array that includes four or more non-coplanar and non-co-axial antennas. In vector notation, three orthogonal coils for a particularly simple basis set: {(1,0,0), (0,1,0), (0,0,1)}. An example of a non-orthogonal basis set would be {(1,0,0), (1,1,0), (1,1,1)}. A non-orthogonal basis set might be useful to satisfy some packaging constraint. A person skilled in the art would recognize that orthogonality is not essential and it may be relaxed to meet physical limitations on the configuration of the locator. The use of four or more coils in the first and second embodiments of our sonde and line locator provides a number of advantages. First, this configuration is robust against failures. It is generally easy to design the circuitry to recognize that one of the coils has failed and to drop back to an (n−1) mathematical solution. Second, the use of four or more coils makes the locator less susceptible to very small scale perturbations in the field. At least squares reduction to three mutually orthogonal components of the field is possible by Gaussian elimination, Singular Value Decomposition or other standard methods. Third, the use of four or more coils allows measurement of local gradients in the field. To do this, a total of eight coils are needed. This is best illustrated by considering the first embodiment which uses a total of six coil, three coils in each antenna array. More information would be desirable, namely, whether the vertical gradient is increased to the left or to the front. The use of three additional coils to the front and three additional coils to the right yields a total of twelve coils to measure these gradients, which results in an over-determined system. The over-determined system can be solved in the least squares sense by the standard methods to yield nine components:

| | | |
|---|---|---|
| *Bx/*x | *By/*x | *Bz/*x |
| *Bx/*y | *By/*y | *Bz/*y |
| *Bx/*z | *By/*z | *Bz/*z |

These nine components are not linearly independent because Maxwell's equations require that the magnetic field has no divergence (del dot B=0) and there are only eight independent components and therefore a minimum of eight coils is required to fully resolve the local curvature and magnitude of the magnetic field. Again, the positions and orientations of these coils do not have to be on a rectilinear set of axes but may be placed on the surface of a sphere, for example. More than eight coils may be reduced to the minimal set of components in a least squares sense.

These and other modifications will be readily apparent to those skilled in the art. Therefore the protection afforded the present invention should only be limited in accordance with the scope of the following claims.

What is claimed is:

1. A transmitter for use with an underground utilities locator, comprising:
   a portable elongate housing;
   an electronic circuit mounted in the housing and configured to generate an electrical output signal at a frequency suitable for tracing an underground utility;
   a pair of springy helical coil type electrical cords each having an inner end connected to the circuit;
   means electrically connected to an outer end of each of the electrical cords for coupling the predetermined electrical output signal across the underground utility; and
   the housing having a pair of upwardly opening pockets formed on opposite ends of the elongate housing and each sized to permit the electrical cords to be wrapped into loops and stowed into corresponding ones of the pockets.

2. The transmitter of claim 1 wherein the electrical cords each have an inner steel conductor.

3. The transmitter of claim 1 and further comprising a control panel located between the pockets.

4. The transmitter of claim 1 wherein the control panel includes a keypad.

5. The transmitter of claim 3 wherein the control panel includes a display and the electronic circuit is further configured so that it can cause the display to indicate alphanumeric and graphic information in response to an entered command.

6. The transmitter of claim 3 wherein the electronic circuit is further configured to allow a user to select via the control panel one of a plurality of predetermined electrical output signals at frequencies suitable for tracing different types of underground utilities.

7. The transmitter of claim 6 wherein the control panel indicates a predetermined color uniquely associated with the type of underground utility when a predetermined command has been entered selecting a frequency for tracing that particular type of underground utility.

8. The transmitter of claim 1 wherein the coupling means is selected from the group consisting of an alligator clip, an inductive antenna and an inductive clamp.

9. The transmitter of claim 1 and further comprising a ground spike and means on the housing for removably receiving the ground spike.

10. The transmitter of claim 1 and further comprising a plurality of batteries mounted in the housing between the pockets and connected to the electronic circuit for powering the same.

* * * * *